US008674528B2

(12) United States Patent
Kobayakawa

(10) Patent No.: US 8,674,528 B2
(45) Date of Patent: Mar. 18, 2014

(54) INTRA-TIRE POWER GENERATING APPARATUS

(75) Inventor: Akira Kobayakawa, Kodaira (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 86 days.

(21) Appl. No.: 13/256,130

(22) PCT Filed: Mar. 11, 2010

(86) PCT No.: PCT/JP2010/054138
§ 371 (c)(1),
(2), (4) Date: Sep. 12, 2011

(87) PCT Pub. No.: WO2010/104156
PCT Pub. Date: Sep. 16, 2010

(65) Prior Publication Data
US 2011/0316290 A1    Dec. 29, 2011

(30) Foreign Application Priority Data

Mar. 13, 2009  (JP) ................................. 2009-061868
May 14, 2009  (JP) ................................. 2009-117820

(51) Int. Cl.
*H02K 7/18* (2006.01)

(52) U.S. Cl.
USPC .......................................................... 290/1 R

(58) Field of Classification Search
USPC .......................................................... 290/1 R
See application file for complete search history.

(56) References Cited

U.S. PATENT DOCUMENTS

| 7,605,486 B2 * | 10/2009 | Bridwell ......................... 290/43 |
| 2006/0279077 A1 * | 12/2006 | Nakano et al. ................ 280/806 |
| 2008/0231132 A1 * | 9/2008 | Minowa et al. ............... 310/114 |
| 2009/0188310 A1 * | 7/2009 | Mancosu et al. ............. 73/146.3 |

FOREIGN PATENT DOCUMENTS

| JP | 3029528 U | 10/1996 |
| JP | 10-052017 A | 2/1998 |

(Continued)

OTHER PUBLICATIONS

International Search Report of PCT/JP2010/054138 dated Jun. 1, 2010.

*Primary Examiner* — Tulsidas C Patel
*Assistant Examiner* — Sean Gugger
(74) *Attorney, Agent, or Firm* — Sughrue Mion, PLLC

(57) ABSTRACT

An intra-tire power generating apparatus capable of producing high power is provided. The apparatus includes rotary magnets and rotary weights, which rotate in response to variations in centrifugal force and circumferential acceleration working on the tire of a running vehicle, and a coil unit, which is located between two rotary magnets facing each other and generates voltages through electromagnetic induction from the rotary magnets. In the apparatus, the rotary magnets and the rotary weights have an identical center line of rotation. The rotary weights are so formed as to have their center of gravity dislocated from the center line of rotation. The rotary magnets are each provided, in the plane orthogonal to the center line of rotation, with an even number of regions adjoining in the circumferential direction around the center line of rotation, the adjoining regions having different magnetic poles from each other. The two rotary magnets facing each other are so configured as to rotate while maintaining the opposition of their respective regions having mutually opposite magnetic poles. And the coil unit has coil windings, each of which is of a tubular shape surrounding a space through which the magnetic flux generated between the mutually opposite magnetic poles of the two rotating rotary magnets passes.

19 Claims, 18 Drawing Sheets

(56) References Cited

FOREIGN PATENT DOCUMENTS

| | | |
|---|---|---|
| JP | 11-155271 A | 6/1999 |
| JP | 2000-092784 A | 3/2000 |
| JP | 2000-278923 A | 10/2000 |
| JP | 2003-102154 A | 4/2003 |
| JP | 2007-028719 A | 2/2007 |
| JP | 2007028719 A * | 2/2007 |
| JP | 2007-300758 A | 11/2007 |
| JP | 2007300758 A * | 11/2007 |
| JP | 2008-220120 A | 9/2008 |

* cited by examiner

INTRA-TIRE POWER GENERATING APPARATUS

CROSS REFERENCE TO RELATED APPLICATIONS

This application is a National Stage of International Application No. PCT/JP2010/054138filed Mar. 11, 2011, claiming priority based on Japanese Patent Application Nos. 2009-061868filed Mar. 13, 2009 and 2009-117820 filed May 14, 2009, the contents of all of which are incorporated herein by reference in their entirety.

TECHNICAL FIELD

The present invention relates to an intra-tire power generating apparatus that can produce high power.

BACKGROUND ART

There have been intra-tire power generating apparatus capable of supplying power to sensor- and radio-equipped devices, such as a tire pressure monitoring system (TPMS) for detecting temperatures and pressures inside the tire, which are installed within the tire air chamber to carry out tire monitoring.

Known for instance are a technology for generating power using a magnet and a coil and sliding a power generator in a spiral manner (refer to Patent Document 1) and a technology for generating power by rotating a rotary weight (refer to Patent Document 2).

RELATED ART DOCUMENTS

Patent Document

Patent Document 1: Japanese Unexamined Patent Application Publication No. 2000-92784
Patent Document 2: Japanese Unexamined Patent Application Publication No. 2000-278923

SUMMARY OF THE INVENTION

Problems to be Solved by the Invention

However, the technology of Patent Document 1 is such that the direction of forces working on the power generator is different from the spiral sliding direction thereof. As a result, high power cannot be produced because the frictional resistance of the power generator is large and thus the power generation efficiency is low. Also, the technology of Patent Document 2 is such that the torque of the rotary weight and the power generating rotor is transmitted through the intermediary of gears. As a result, high power cannot be produced because the rotational resistance is high and thus the power generation efficiency is low.

The present invention has been made in view of the foregoing problems, and an object thereof is to provide an intra-tire power generating apparatus that can produce high power.

Means for Solving the Problem

According to the present invention, an intra-tire power generating apparatus to be installed in a tire air chamber comprises a plurality of rotary magnets and a rotary weight configured to rotate in response to variations in centrifugal force and circumferential acceleration working on a tire of a running vehicle and a coil unit located between two rotary magnets facing each other and generating voltages through electromagnetic induction from the rotary magnets. In this apparatus, the rotary magnets and the rotary weights have an identical center line of rotation; the rotary weights are each so formed as to have the center of gravity thereof dislocated from the center line of rotation thereof; the rotary magnets are each provided, in a plane orthogonal to the center line of rotation, with an even number of regions adjoining each other in the circumferential direction around the center line of rotation, the adjoining regions having different magnetic poles from each other; the two rotary magnets facing each other are so configured as to rotate while maintaining an opposition of the respective regions thereof having mutually opposite magnetic poles; and the coil unit comprises coil windings, each of the coil windings being a coil wound in a tubular shape surrounding a space where magnetic flux generated between the mutually opposite magnetic poles of the two rotating rotary magnets passes. Therefore, the two rotary magnets rotate as the rotary weights rotate in response to variations in centrifugal force and circumferential acceleration working on the tire of a running vehicle. Now the rotation of the two rotary magnets causes changes in the direction of magnetic flux $\phi$ passing through the tube of the coil winding, which in turn generate voltages in the coil. Hence, the power generation efficiency is excellent, and high power can be produced. Also, the rotary magnet has an even number of regions adjoining each other in the circumferential direction around the center line of rotation in a plane orthogonal to the center line of rotation. Therefore, a continuous power generation can be performed with high efficiency.

The rotary magnet is provided with a yoke on the surface opposite to the surface thereof facing the coil unit. Therefore, the magnetic flux density of the magnetic flux $\phi$ passing through the tube of each coil winding can be increased, so that high power can be produced.

The number of the even-numbered regions of the rotary magnet is six. Therefore, the rate of changes in the direction of magnetic flux $\phi$ passing through the tube of each coil winding can be made quicker, and there is an excellent balance with the magnetic flux density, so that high power can be produced.

Each of the even-numbered regions of the rotary magnet is a region derived by dividing the rotary magnet into equal parts along the circumferential direction. Therefore, a constant level of high power can be produced continuously by the rotation of the rotary magnet.

The number of the coil windings of a coil unit is the same as the number of the even-numbered regions of the rotary magnet. The coil winding is so formed as to have the same shape in cross section orthogonal to the center line of the tube thereof as the shape of the region. The coil windings are arranged around the center line of rotation, and the center line of the tube of each coil winding is aligned with the center of each of the corresponding regions of the rotary magnets when both ends of the tube of each coil winding face one-on-one the corresponding regions of the two rotary magnets. Therefore, the rate of changes in the direction of magnetic flux $\phi$ passing through the tubes of the plurality of coil windings can be made quicker, so that high power can be produced.

The rotary weights are disposed on the side of the respective rotary magnets opposite to the surfaces thereof facing the coil unit, and the plurality of rotary magnets and a rotary weight are disposed symmetrically with respect to the coil unit in the middle. Therefore, there is a better balance in the rotation of the rotary magnet and the rotary weight, which will reduce the possibilities of functional failure.

The rotary weights and rotary magnets are attached to a single rotary shaft, and the rotary shaft is supported rotatably at both ends thereof by rotary shaft supports fixed to an inner surface of a tire via a base. Therefore, the two rotary magnets rotating while facing each other can maintain with precision the state of opposition of their respective regions having mutually opposite magnetic poles. As a result, the disturbance in magnetic flux can be prevented and the power generation efficiency can be raised.

According to the present invention, an intra-tire power generating apparatus to be installed in a tire air chamber comprises rotator attached to a rotary shaft and rotating in response to variations in forces working on a tire of a running vehicle, a part of each rotator being formed of a magnet such that the center of rotation thereof is dislocated from the center of gravity thereof, and a coil unit located between the magnets of two rotators facing each other in rotation and generating voltages through electromagnetic induction from the magnets. In the apparatus, the coil unit comprises coil windings, each of the coil windings being a coil wound in a tubular shape surrounding a space where magnetic flux generated between the mutually opposite magnetic poles of the two rotating rotary magnets passes. Therefore, the rotation of the rotators causes changes in the direction of magnetic flux $\phi$ passing through the space of the tube of the coil winding, so that high power can be produced. Also, this can make the apparatus smaller and lighter because the number of component parts can be reduced in comparison with the arrangement of having the rotator and the magnet separately.

The moment of inertia (Imax) of the rotator, when the rotator is divided into two parts by a plane passing the center of rotation thereof in such a manner as to maximize the moment of inertia thereof, is 80 percent or more of the total moment of inertia (Itotal) of the rotator. Therefore, the degree of eccentricity of the rotator can be increased, and large circumferential acceleration at the time of a tire engaging a road surface can be taken in. This will allow the rotator to rotate with greater ease, and the rate of changes in the direction of magnetic flux $\phi$ passing through the space of the tube of the coil winding becomes quicker. As a result, high power can be produced, a continuous power generation can be performed efficiently, and the output of electricity can be increased.

The rotator has a plurality of magnets having different magnetic poles from each other arranged along the direction of rotation of the rotator. Therefore, there is an increase in pole changing points. And, as the rotator rotates, the rate of changes in the direction of magnetic flux $\phi$ passing through the space of the tube of each coil winding can be made quicker, so that high power can be produced.

The magnet of the rotator is provided with a yoke on the surface thereof opposite to the surface thereof facing the coil unit. Therefore, generation of self-contained magnetic field within the magnet can be controlled, and the magnetic flux density of magnetic flux $\phi$ passing through the tube of each coil winding can be raised, so that high power can be produced.

The coil windings are located in a projected area of the rotation locus of the magnets of the rotators. Therefore, the magnetic flux density of magnetic flux $\phi$ passing through the tube of each coil winding can be raised, so that high power can be produced.

The peripheral shape of the tube of the coil winding in cross section is the same as the peripheral shape of the magnet of the rotator in cross section, and the perimeter of the coil winding in cross section is smaller than the perimeter of the magnet of the rotator in cross section when the center line of the magnet in cross section coincides with the center line of the tube of the coil winding in cross section by the rotation of the rotor. Therefore, the resistance of the coil winding can be made smaller, and the power generation efficiency higher.

The a plurality of coil windings are provided, and each of the coil windings is provided with a rectifying circuit and a charging circuit. Therefore, the amount of charge can be increased.

The magnets of the two rotators are formed in shapes symmetrical to each other with respect to the coil unit in the middle, and these two rotators are attached to a single rotary shaft such that the rotators and the rotary shaft are rotatable together while maintaining the opposition of the magnets of the two rotators in shapes symmetrical to each other with respect to the coil unit in the middle. Therefore, stable magnetic field can be supplied to the coil unit, and therefore the power generation efficiency can be raised.

The whole of the rotator is formed of a magnet. Therefore, the ratio of the magnet to the entire intra-tire power generating apparatus can be made higher. Also, the magnetic flux density of magnetic flux $\phi$ passing through the tube of each coil winding can be raised, so that high power can be produced. The rotator is formed of a yoke member and a magnet. The yoke member has a yoke face plate, which consists of a fan section having an angle of 180 degrees or less between the two radial edges of the fan and a pivot section of the fan section, and magnet positioning plates, which are disposed along the outer periphery of the fan section vertically from the face of the fan section, the pivot section of the fan section being provided with a mounting hole for the rotary shaft. And the magnet is formed in a fan shape corresponding to the fan-shaped magnet setting area defined by the yoke face plate and the magnet positioning plates, has a curved notch portion corresponding to the peripheral surface of the rotary shaft at the pivot of the fan, and is placed in the magnet setting area. Therefore, the magnet having no mounting portion for the rotary shaft allows the rotator to rotate with greater ease. As a result, the rate of changes in the direction of magnetic flux $\phi$ passing through the space of the tube of each coil winding becomes quicker, and high power can be produced. Also, a continuous power generation can be performed efficiently, and the output of electricity can be increased. Moreover, the number of components can be reduced by the use of the magnet as the eccentric weight. This also allows the magnet to rotate with greater ease, thereby producing high power and increasing the output of electricity.

The mounting hole is formed as a hole which has at least one straight side, and the portion of the rotary shaft to be fitted in the mounting hole is formed in a cross-sectional shape corresponding to the mounting hole. Therefore, the work is made easier for mounting the two rotators on the rotary shaft by positioning the magnets of the rotators such that the rotators and the rotary shaft are rotatable together while maintaining the opposition of the magnets of the two rotators in shapes symmetrical to each other with respect to the coil unit in the middle.

The coil unit is fixed to a coil unit securing member which is fixed to an inner surface of a tire through a base. Therefore, the position of the coil unit can be maintained with precision in relation to the two rotary magnets rotating in opposition to each other or in relation to the two rotators rotating in opposition to each other. Thus, disturbance in the magnetic flux can be prevented, and the power generation efficiency can be raised.

The rotary shaft is disposed on the back side of the tread surface in such a manner as to extend in the tire axial direction. Therefore, the rotary weights rotate with ease in response to variations in centrifugal force and circumferential acceleration working on the tire of a running vehicle. Also, the rotators rotate with ease in response to variations in centrifugal force and circumferential acceleration working on the tire of a running vehicle. Thus, high power can be produced.

BEST MODE FOR CARRYING OUT THE INVENTION

First Embodiment

A first embodiment of the present invention will be described with reference to FIGS. 1 to 9.

Figure 1:
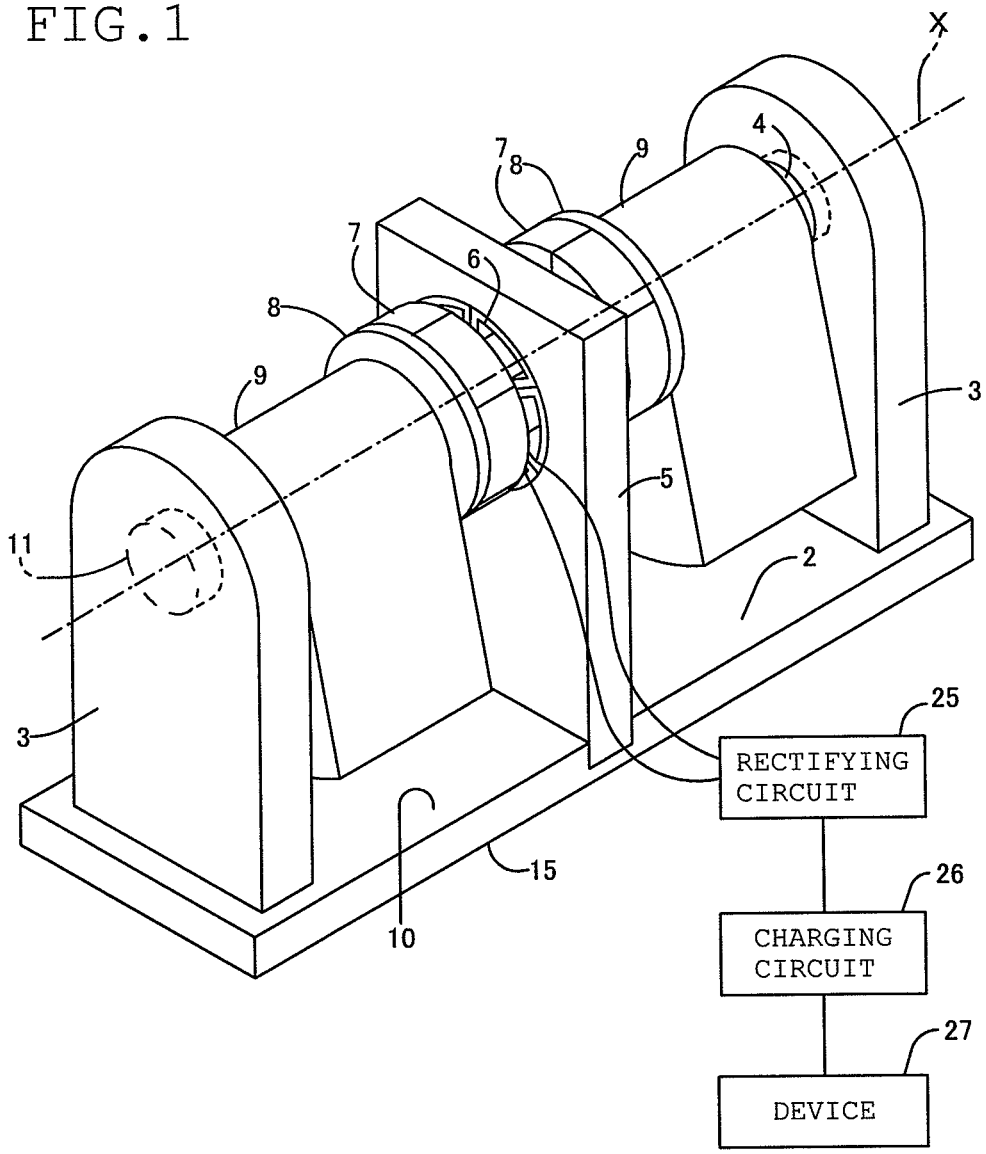
FIG. 1 is a perspective view showing an intra-tire power generating apparatus (first embodiment).
Figure 2:
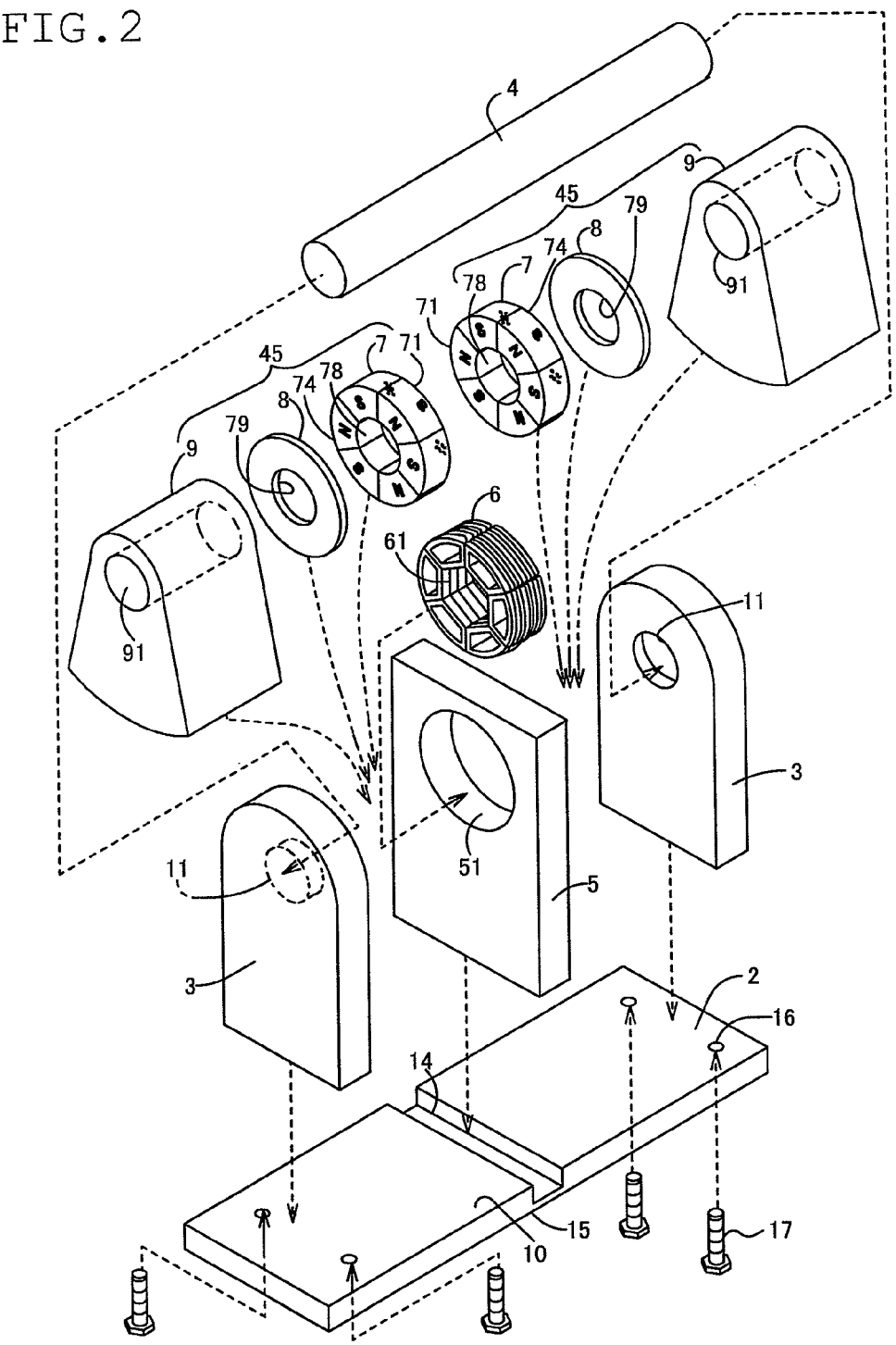
FIG. 2 is an exploded perspective view showing an intra-tire power generating apparatus (first embodiment).

As shown in FIGS. 1 and 2, an intra-tire power generating apparatus 1 to be installed inside a tire air chamber according to the first embodiment includes a base 2, two rotary shaft supports 3,3, a straight rotary shaft 4, a coil unit securing member 5, a coil unit 6, two rotary magnets 7,7, disk-shaped yokes (soft magnetic bodies) 8,8 disposed on the respective rotary magnets 7,7, and two rotary weights 9,9. Both ends of the coil led out from the coil unit 6 are connected to a rectifying circuit 25.

The base 2 is formed of a rectangular flat plate, for instance. The rotary shaft supports 3,3 are attached to both the end portions near the short sides of a rectangular base surface 10, which is one of the surfaces of a flat plate forming the base 2. The rotary shaft support 3 is provided in the upper part thereof with a bearing 11 which rotatably supports an end portion of the rotary shaft 4. The bearing 11 is formed as a bearing member which is installed in a hole formed in the upper part of the rotary shaft support 3 or as a bearing hole which is formed in the upper part of the rotary shaft support 3. The coil unit securing member 5 is attached to the midportion of the length of the rectangular base surface 10. The coil unit securing member 5 is provided in the upper part thereof with a through hole 51 in which the coil unit 6 is secured.

The rotary shaft 4 penetrates through the center hole 61 of the coil unit 6 which is secured in the through hole 51 in the coil unit securing member 5, and both ends of the rotary shaft 4 are rotatably supported by the bearings in the rotary shaft supports 3,3 which are attached to both ends of the base surface 10. The center hole 61 is formed such that the diameter thereof is larger than the diameter of the rotary shaft 4 so that no contact occurs between the rotary shaft 4 and the coils 65 of the coil unit 6.

A rotary component set 45 is disposed on one part of the rotary shaft 4, which is positioned between the coil unit securing member 5 and one rotary shaft support 3, and on the other part of the rotary shaft 4, which is positioned between the coil unit securing member 5 and the other rotary shaft support 3.

A rotary component set 45 is constituted of a rotary magnet 7, a yoke 8, and a rotary weight 9. The rotary magnet 7 is formed in a disk shape having a through hole 78 in the center thereof which allows the rotary shaft 4 to pass through in a fitted manner. The yoke 8 is formed in a disk shape having a through hole 79 in the center thereof which allows the rotary shaft 4 to pass through in a fitted manner. The rotary weight 9 performs its function if it has its center of rotation dislocated from its center of gravity. For example, the rotary weight 9 is formed of a fan-shaped (sectorial) plate smaller than a semi-circular plate, and is so configured as to have a through hole 91 in the center of the fan shape, which is the center of rotation, allowing the rotary shaft 4 to pass through in a fitted manner. The rotary shaft 4 is fitted into the through hole 78 of the rotary magnet 7, the through hole 79 of the disk-shaped yoke 8, and the through hole 91 of the rotary weight 9, and the outer peripheral surface of the rotary shaft 4 is fixed to the rotary magnet 7, the yoke 8, and the rotary weight 9 by some bonding means such as an adhesive or welding. The rotary magnet 7, the yoke 8, and the rotary weight 9, which are fixedly attached to the outer peripheral surface of the rotary shaft 4, rotate together with the rotary shaft 4. The rotary magnet 7, the yoke 8, and the rotary weight 9 share the same center line X of rotation.

The rotary magnets 7,7 of the respective rotary component sets 45 are disposed in positions facing each other, with the coil unit 6 fixed to the through hole 51 in the coil unit securing member 5 in between them. The yoke 8 is fixed with an adhesive to a surface 74 of the rotary magnet 7 closer to the rotary shaft support 3. The rotary weight 9 is attached to the rotary shaft 4 located between the yoke 8 and the rotary shaft support 3. The rotary weights 9,9 are respectively disposed on the sides opposite to the surfaces of the rotary magnets 7,7 facing the coil unit 6. There are two rotary component sets 45, which are each a set of a rotary magnet 7, a yoke 8, and a rotary weight 9. And a pair of rotary component sets 45 are disposed symmetrically with the coil unit 6 in the middle.

Figure 4:
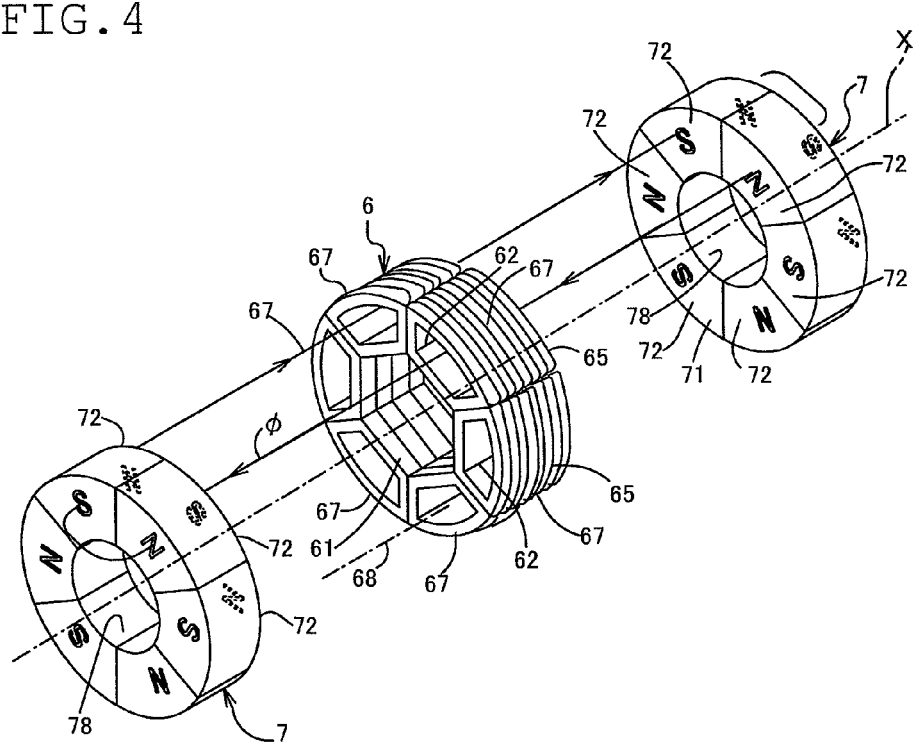
FIG. 4 is a perspective view showing a relationship between a coil unit and two rotary magnets (first embodiment).

As shown in FIG. 4, the rotary magnet 7 is provided with a ring-shaped surface 71 with a center hole, orthogonal to the center line X of rotation, which consists of an even number of regions 72 adjoining each other in the circumferential direction around the center line X of rotation. And the adjoining regions 72,72 are so configured as to have different magnetic poles from each other.

The two rotary magnets 7,7 facing each other with the coil unit 6 in between are fixed to the rotary shaft 4 such that they rotate while maintaining the opposing state of their respective regions 72, 72 having mutually opposite magnetic poles.

The even number of regions 72 of a rotary magnet 7 are each a region of the rotary magnet 7 derived by dividing it into six equal parts along the circumferential direction thereof. For example, when a rotary magnet 7 is formed with six fan-shaped unit magnets of 60-degree sectorial angle bonded together with an adhesive, the unit magnets constituting the circumferentially adjoining regions 72 are polarized to have magnetic poles different from each other. Or the arrangement may be such that six fan-shaped plates, which serve as the six regions 72 dividing the circumference into every 60 degrees, are attached to a disk-shaped magnet body with a through hole 78 in the center thereof, and the adjoining fan-shaped plates are polarized to have magnetic poles different from each other to form a rotary magnet 7 to be used.

Then the rotary magnets 7,7 facing each other with the coil unit 6 in between are fixed to the rotary shaft 4 in such a manner that the opposing fan-shaped plates thereof have mutually opposite magnetic poles.

As shown in FIG. 4, the coil unit 6 is provided with six coil windings 64, which have each a coil wound around in a tubular shape surrounding a space 62 where magnetic flux $\phi$ generated between the opposing regions 72,72 having mutually opposite magnetic poles of the two rotating rotary magnets passes. For example, a coil winding 67 provides a structure of a coil 65 wound around to form a fan-sectioned tube shape through which magnetic flux $\phi$ generated between the mutually opposite magnetic poles of the two rotating rotary magnets passes. Preferably, a rectangular wire having a rectangular cross section should be used for the coil 65. This will raise the power generation efficiency because the winding resistance can be reduced, the coil turns can be increased, and the winding density can be raised.

For example, as shown in FIG. 4, if the number of the coil windings 67 of a coil unit 6 is to be the same as the number of the even-numbered regions 72 of the rotary magnets 7,7, which have each a fan-shaped face, then the coil windings 67 are each formed to have the same fan-shaped cross section perpendicular to the center line 68 of the tube thereof as the fan shape of the regions 72. Where both ends of the tube of each coil winding 67 are to be arranged in such a manner as to face one-on-one the corresponding regions 72,72 of the two rotary magnets 7,7, the center line 68 of the tube of the coil winding 67 is aligned with the center of the regions 72,72. That is, six coil windings 67 are arranged around the center line X of rotation, thereby constituting a coil unit 6 of the same shape as the rotary magnets 7. In other words, the diameter of the outer periphery of the rotary magnets 7 is the same as the diameter of the outer periphery of the coil unit 6.

Figure 3:
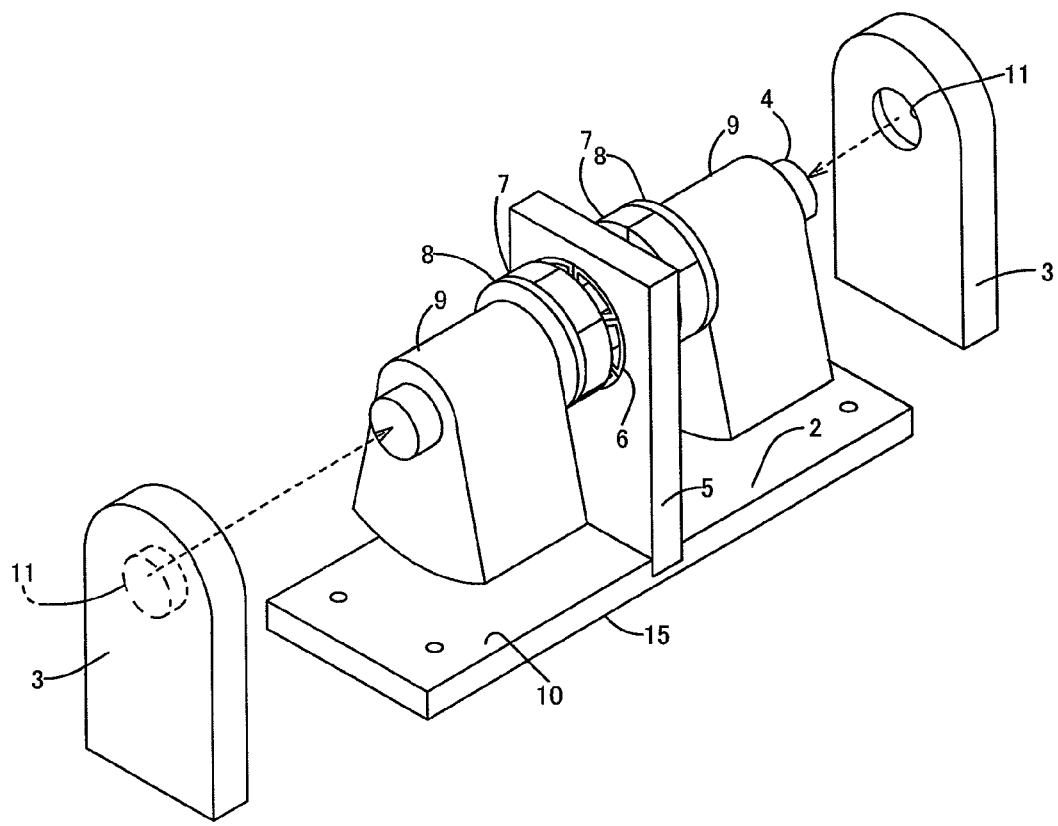
FIG. 3 is an exploded perspective view showing a method of assembling an intra-tire power generating apparatus (first embodiment).

A description will now be given of an exemplary method for assembling an intra-tire power generating apparatus by referring to FIG. 2 and FIG. 3. First, a coil unit 6 is fixed in the through hole 51 in a coil unit securing member 5 with an adhesive, and a rotary shaft 4 is passed through the center hole 61 of the coil unit 6. Yokes 8 are each bonded to one surface 74 of the rotary magnets 7 in advance. From each end of the rotary shaft 4, the rotary magnet 7 with the yoke 8 bonded thereto and the rotary weight 9 are fitted in order thereon, and the rotary magnet 7 with the yoke 8 bonded thereto and the rotary weight 9 are fixed with an adhesive to the rotary shaft 4 in the predetermined positions. The lower end of the coil unit securing member 5 is fitted into a fitting recess 14 in the base surface 10 and fixed there with an adhesive. After both ends of the rotary shaft 4 are inserted in the bearings 11 in the respective rotary shaft supports 3, the lower ends of the rotary shaft supports 3 are brought into contact with the base surface 10 in such a manner that the through holes 16 so formed as to penetrate the base 2 are aligned with the not-shown threaded holes so formed in the lower end faces of the rotary shaft supports 3 as to extend upward therein. Then screws 17 are passed through the through holes 16 from the other surface 15 of the base 2 and driven into the threaded holes, thereby fixing the rotary shaft supports 3 to the base surface 10. Thus completes the assembling of an intra-tire power generating apparatus 1.

An intra-tire power generating apparatus 1 implementing a structure as described above is installed with the other surface 15 of the base 2 fixed to a position which is, for instance, the back side of the tread surface within the tire air chamber. Now, as the vehicle travels, the rotary weights 9,9 rotate, and the two rotary magnets 7,7 facing each other also rotate, in response to variations in centrifugal force which has the highest energy among all the vibrations within the tire. Along with the rotation of these two rotary magnets 7,7, there occur changes in the direction of magnetic flux $\phi$ passing through the tube of each coil winding 67, which in turn generate voltages in the coil 65. These voltages are charged to the charging circuit 26 via the rectifying circuit 25 and then supplied to the device 27.

It is to be noted that the vibration resulting from the rotation of a tire is caused by changes in yaw due to the bending of the belts in the tire. This tire vibration appears in particular at the moment of the tire engaging a road surface and the moment of the tire disengaging it. The closer the point is to the center of the tire from the belts, the greater this vibration will be. Thus, if the base 2 is fixed to the back side of a tread surface and the rotary shaft 4 rotatably supporting the rotary component sets 45 is located in a position further away from the back side of the tread surface toward the center of the tire, then a large energy can be given to the rotary component sets 45, with large acceleration working thereon. Accordingly, the position of the rotary shaft 4 is chosen such that the distance thereof from the back side of the tread surface toward the center of the tire is 10 mm or more and 40 mm or less.

According to the first embodiment, the rotary magnet 7 is provided, in a plane orthogonal to the center line X of rotation, with an even number of regions 72 adjoining each other in the circumferential direction around the center line X of rotation. Therefore, the rate of changes in the direction of magnetic flux φ passing through the tube of each coil winding 67 can be quickened, so that a continuous power generation can be performed efficiently to produce high power.

According to the first embodiment, the number of the even-numbered regions 72 of the rotary magnet 7 is the same as the number of the coil windings 67 of the coil unit 6. Therefore, the rate of changes in the direction of magnetic flux φ passing through the tube of each coil winding can be quickened, so that high power can be produced.

According to the first embodiment, the number of the even-numbered regions 72 of the rotary magnet 7 and the number of the coil windings 67 of the coil unit 6 are both six. Therefore, the rate of changes in the direction of magnetic flux φ passing through the tube of each coil winding can be quickened and there is an excellent balance with the level of magnetic flux density, so that high power can be produced.

According to the first embodiment, the coil windings 67 are each formed to have the same shape in cross section orthogonal to the center line 68 of the tube thereof as that of each region 72, and the coil windings 67 are arranged around the center line X of rotation. And the center line 68 of the tube of the coil winding 67 is aligned with the center of the region 72 of the rotary magnet 7,7 when both ends of the tube of each coil winding 67 are arranged in such a manner as to face one-on-one the corresponding regions 72,72 of the two rotary magnets 7,7. Therefore, the rate of changes in the direction of magnetic flux φ passing through the tubes of the plurality of coil windings 67 can be made quicker, and high power can be produced.

The coil unit 6 sticking out beyond the outer periphery of the rotary magnet 7 may lower the power generation efficiency because of the longer winding length of each coil winding 67 and the consequently greater resistance thereof. Yet, according to the first embodiment, the diameter of the rotary magnet 7 is the same as that of the coil unit 6, so that the resistance of the coil windings 67 is small and consequently the power generation efficiency is high.

According to the first embodiment, the even number of regions 72 of the rotary magnet 7 are all regions divided equally along the circumferential direction, so that a constant level of high power can be produced continuously by the rotation of the rotary magnet 7.

According to the first embodiment, the rotary magnets 7 are each provided with a yoke 8 on the surface 74 opposite to the surface thereof facing the coil unit 6. Therefore, the magnetic flux density of the magnetic flux φ passing through the tube of each coil winding 67 can be increased, so that high power can be produced.

According to the first embodiment, the rotary weights 9 are disposed on the surfaces 74 of the respective rotary magnets 7,7 opposite to the surfaces thereof facing the coil unit 6, and the sets of a rotary magnet 7 with a yoke 8 attached and a rotary weight 9 are disposed symmetrically with respect to the coil unit 6 in the middle. Therefore, there is a better balance in the rotation of the rotary magnet 7 and the rotary weight 9, which will reduce the possibilities of functional failure.

According to the first embodiment, the rotary weights 9 and rotary magnets 7 are attached to a single rotary shaft and the rotary shaft 4 is supported rotatably at both ends thereof by rotary shaft supports 3,3 fixed to an inner surface of the tire via the base 2. Therefore, the two rotary magnets 7,7 rotating while facing each other can maintain with precision the state of opposition of their respective regions having mutually opposite magnetic poles, so that disturbance in the magnetic flux can be prevented and the power generation efficiency can be raised.

According to the first embodiment, the coil unit 6 is secured by the coil unit securing member 5 fixed to an inner surface of the tire via the base 2. Therefore, the position of the coil unit 6 can be maintained with precision in relation to the two rotary magnets 7,7 rotating while facing each other, so that disturbance in the magnetic flux can be prevented, and the power generation efficiency can be higher.

Example of First Embodiment

The tire size used was 225/55R17.

An intra-tire power generating apparatus 1 was installed within a tire air chamber by joining the other surface 15 of the base 2 to an axially central hole on the back side of the tread surface with an adhesive. It was installed in such a way that the rotary shaft 4 extended in the tire axial direction. The distance from the back side of the tread surface to the rotary shaft 4 was 20 mm.

The distance between the two rotary magnets 7,7 was 2 mm, the plate thickness of a rotary magnet 7 along the center line X of rotation was 1.5 mm, and the plate thickness of a yoke 8 along the center line X of rotation was 0.5 mm.

The coil unit 6 was 10 mm in diameter, 4 mm in diameter of the center hole 61, and 1.5 mm in thickness along the center line X of rotation. Also, the wire diameter of the coil was 0.08 mm, and the number of turns of a coil winding 67 was 900 turns.

The rotary magnet 7 was 10 mm in diameter and 1.5 mm in plate thickness along the center line X of rotation.

The yoke 8 was 10 mm in diameter and 0.5 mm in plate thickness along the center line X of rotation.

The distance between the two rotary magnets 7,7 was 2 mm, and the distance between the rotary magnet 7 and the coil unit 6 was 0.25 mm.

The rotary weight 9 was 60 degrees in center angle of the fan, 8 mm in radius, and 7 grams in weight.

The rotary shaft was 22 mm in length between the bearings 11,11 and 2 mm in shaft diameter.

The vehicle was operated from the stored voltage of 0 V until it stabilizes at a certain voltage level at each of the speeds of 30 km/h to 120 km/h in 10 km/h increments.

The output of electricity ($W=V^2/R$) was calculated from the stabilized voltage and the load ($R=500\Omega$) of the device.

Figure 5:
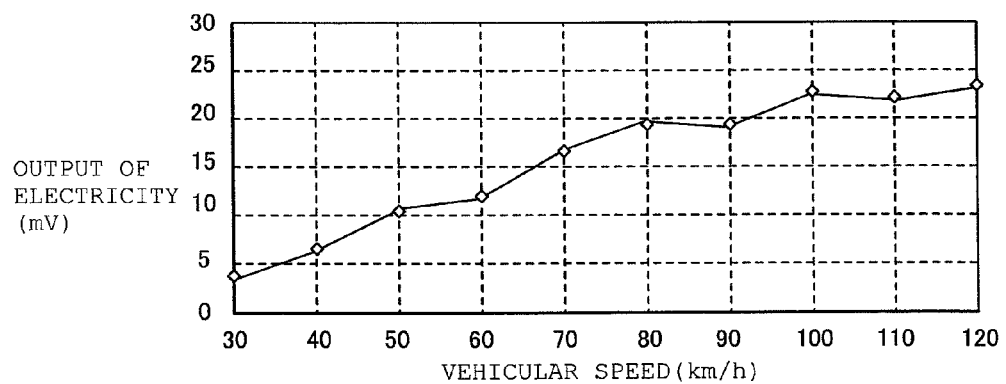
FIG. 5 is a diagram showing the results of an example of the first embodiment (first embodiment).

The relationship between the vehicle speed and the output of electricity obtained in this example is shown in FIG. 5.

Figure 6:
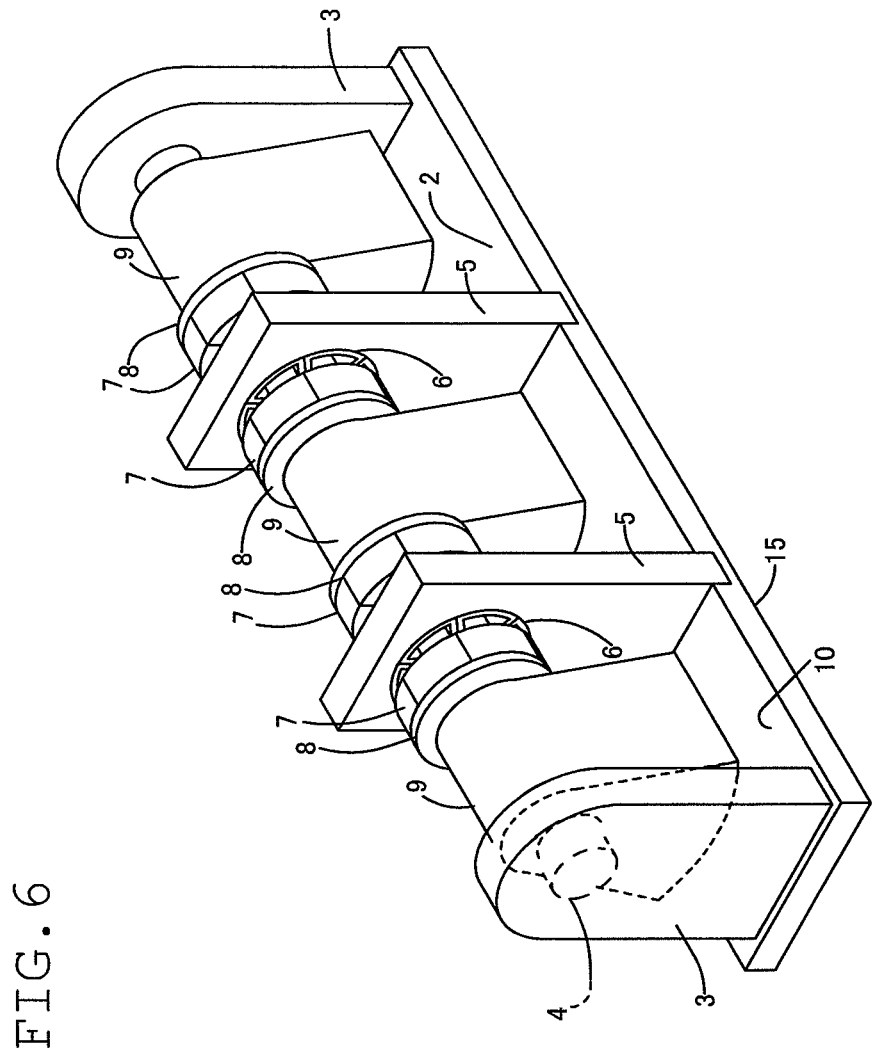
FIG. 6 is a perspective view showing an intra-tire power generating apparatus (first embodiment).

In the first embodiment of the present invention, the intra-tire power generating apparatus may be provided with two or more coil units 6, two pairs or more of the two rotary magnets 7,7, and three or more of rotary weights 9. For example, as shown in FIG. 6, the arrangement may be such that the intra-tire power generating apparatus is provided with two coil units 6, two pairs of the two rotary magnets 7,7, and three rotary weights 9. With this intra-tire power generating apparatus, higher power can be produced because there are two power generating sections, each consisting of a coil unit 6 and two rotary magnets 7,7, and the rotation of the rotary shaft 4 becomes faster due to an increase of rotary weights 9.

Figure 7:
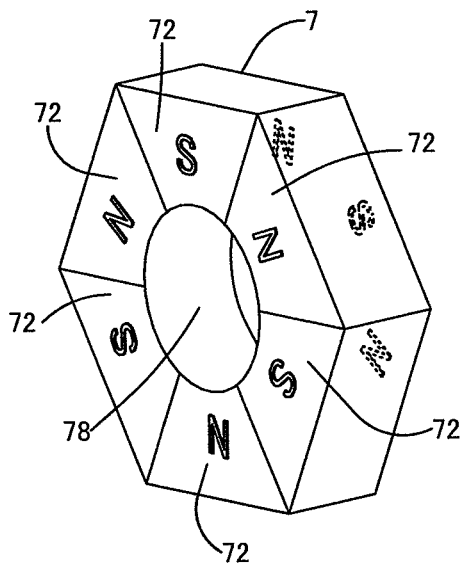
FIG. 7 is a perspective view showing another example of a rotary magnet (first embodiment).

In the first embodiment, the rotary magnet 7 may be formed in a polygonal plate shape having a through hole 78 in the center thereof for the rotary shaft 4 to pass through. For example, as shown in FIG. 7, the rotary magnet 7 may be one in a hexagonal plate shape having six poles.

Figure 8:
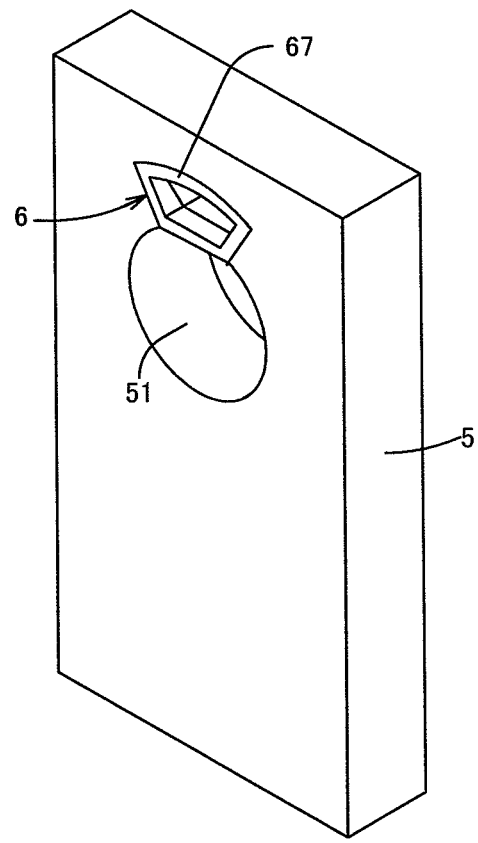
FIG. 8 is a perspective view showing another example of a coil unit (first embodiment).

The above description has illustrated a coil unit 6 which is formed of a plurality of coil windings 67 completely encircling the center line X of rotation. In the first embodiment, however, the coil unit 6 may be structured with a plurality of coil windings 67 or a single coil winding 67 not completely encircling the center line X of rotation. For example, as shown in FIG. 8, the coil unit 6 may be structured with a single coil winding 67 which is of a shape corresponding to a region 72 of a rotary magnet 7.

Figure 9:
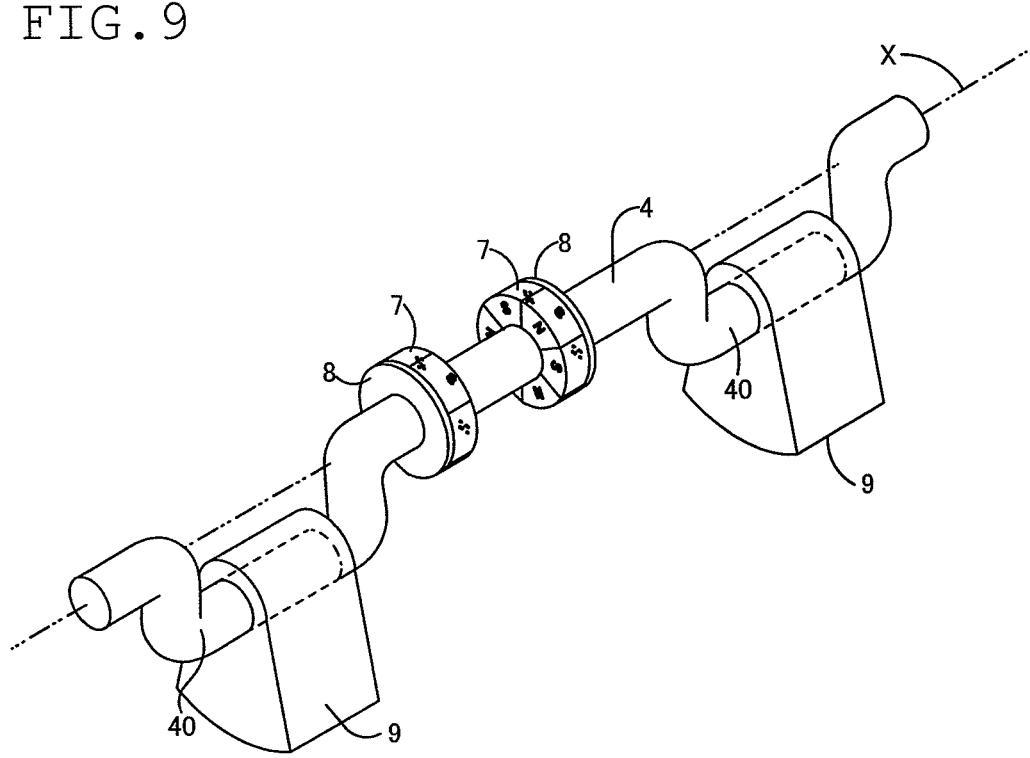
FIG. 9 is a perspective view showing another example of a rotary shaft (first embodiment).

In the first embodiment, as shown in FIG. 9, a rotary shaft 4 may be used which has its portion 40 for mounting the rotary weight 9 in a position out of alignment with the center line X of rotation. In this case, the rotary weight 9 will rotate with greater ease because of the larger rotary inertia working thereon, with the result that higher power can be produced.

Second Embodiment

A second embodiment of the present invention will be described with reference to FIGS. 10 to 22. Note that although there are some components of the first embodiment and the second embodiment which have identical reference numerals but different names, the combinations of the components and their reference numerals as employed in each of the embodiments must be construed as valid.

Figure 10:
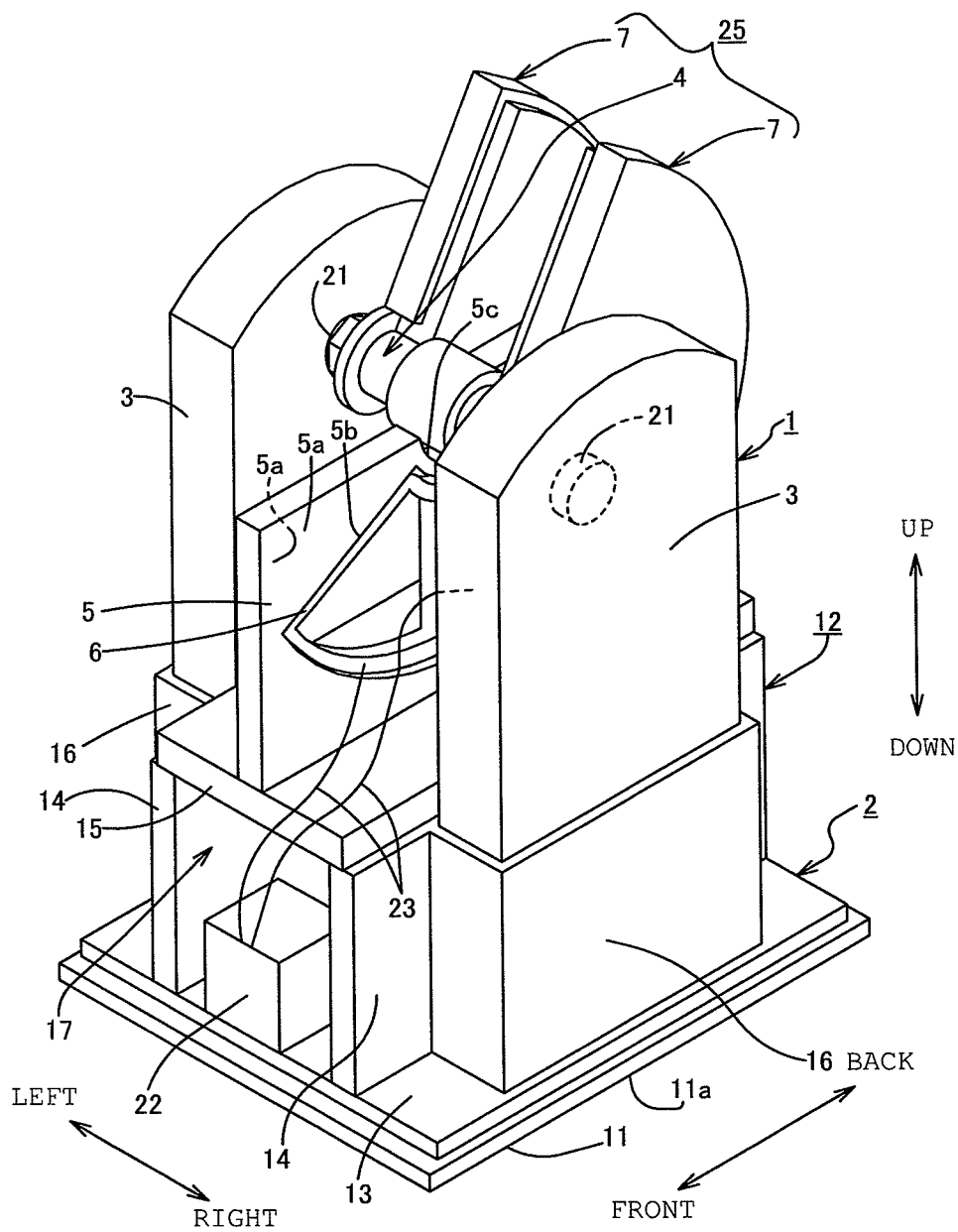
FIG. 10 is a perspective view showing an intra-tire power generating apparatus (second embodiment).
Figure 11:
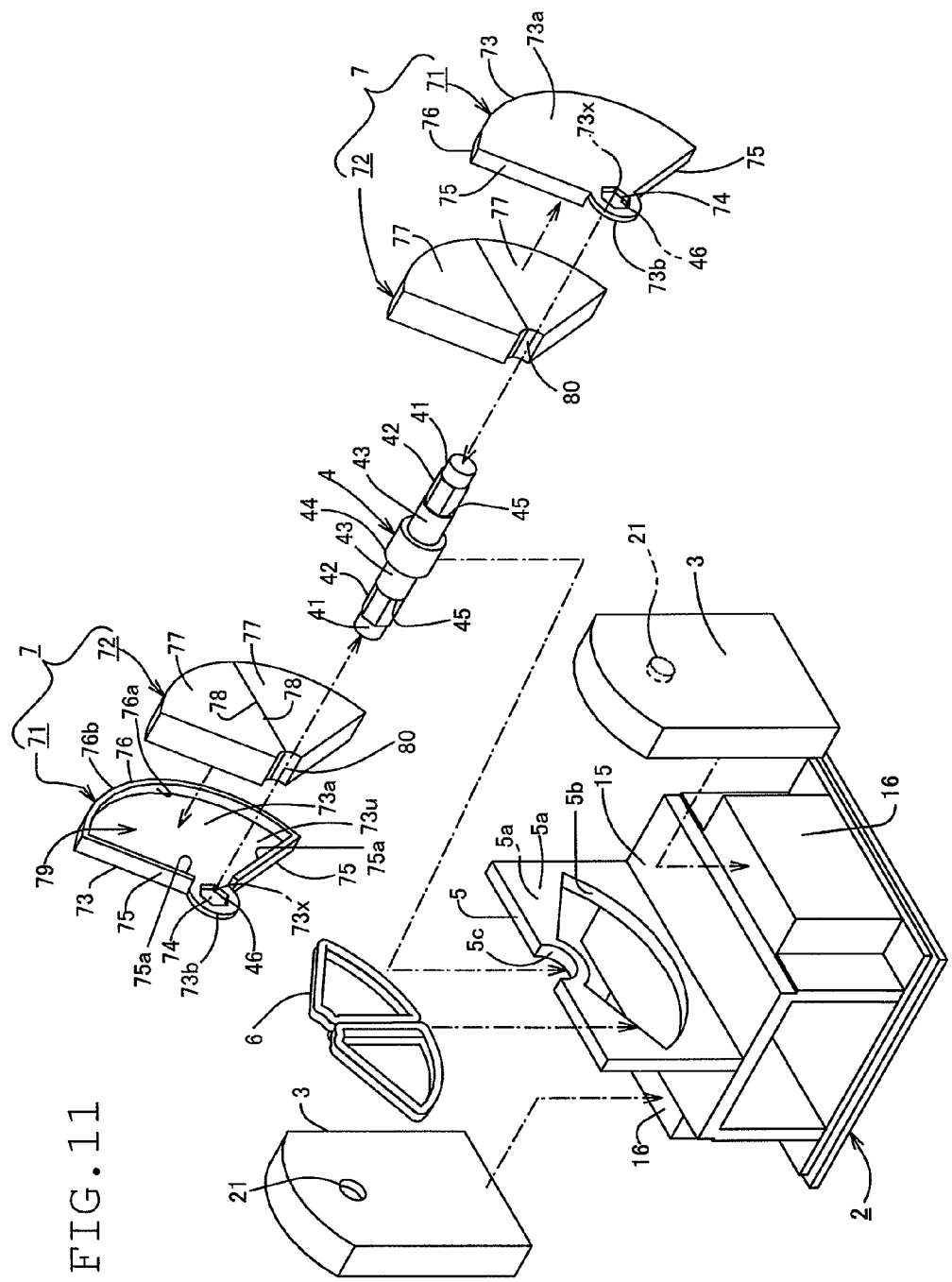
FIG. 11 is an exploded perspective view showing an intra-tire power generating apparatus (second embodiment).

As shown in FIGS. 10 and 11, an intra-tire power generating apparatus 1 to be installed inside a tire air chamber according to the second embodiment includes a base 2, two rotary shaft supports 3,3, a straight rotary shaft 4, a coil unit securing member 5, a coil unit 6, and two rotators 7,7. Both ends of the coil unit 6 are connected to a rectifying circuit 18 (see FIG. 13) via electric wire 23. The base 2, the two rotary shaft supports 3,3, the rotary shaft 4, and the coil unit securing member 5 are formed of nonmagnetic materials. The base 2, the rotary shaft supports 3,3, and the coil unit securing member 5 are, for example, formed of an acrylic resin, and the rotary shaft 4 is, for example, formed of SUS304 as specified in JIS (Japanese Industrial Standards). Note that positional relationships of up and down, front and back, and left and right as used in the description of the second embodiment are indicated by arrows in FIG. 10.

The base 2 is provided, for instance, with a base plate 11, which is formed of a rectangular flat plate, and an anchoring stand 12, which is disposed on the base plate 11. The anchoring stand 12 may comprise of a bottom plate 13, a pair of left and right side walls 14,14, a top plate 15, left and right side rests 16,16, and a stowing space 17. The bottom plate 13, which is a rectangular flat plate slightly smaller than the base plate 11, is disposed concentrically on top of the base plate 11. The pair of left and right side walls 14,14, which are disposed on the bottom plate 13 with a spacing in between, extend in the vertical (up-down) direction and front-back direction. The side walls 14,14 are disposed on the bottom plate 13 in positions the same distance from the left and right edges thereof, respectively. The top plate 15 is disposed astride the top end faces of the pair of left and right side walls 14,14. The left and right side rests 16,16 are disposed in such a manner that they extend from the left and right outer surfaces of the left and right side walls 14,14 on the bottom plate 13, which are closer to the left and right edges respectively of the bottom plate 13, and from the top surface of the bottom plate 13. The stowing space 17 is formed by a space which is enclosed by the bottom plate 13, the left and right side walls 14,14, and the top plate 15 and opening in the front and back. Stowed in the stowing space 17 is a pack of electric components 22, such as a rectifying circuit 18, a charging circuit 19, and a device 20 like a wireless module, which are shown inside the dotted line in FIG. 13. It should be appreciated here that the base 2 may be constructed of the above-described parts assembled or may be formed in an integral molding of all above-described parts.

The top surface of the top plate 15 and the top faces of the side rests 16 are formed into planes parallel to the top plane of the base plate 11. The rotary shaft supports 3,3 are disposed on the top faces of the side rests 16 in such a manner as to extend upward therefrom, and the coil unit securing member 5 is disposed on the top surface of the top plate in such a manner as to extend upward therefrom.

The coil unit securing member 5 may be one integrally formed with the top plate 15 or one formed separately from the top plate 15 and fixed to the top surface of the top plate 15 by a fixing means such as an adhesive. The coil unit securing member 5 is formed of a flat plate having opposite surfaces 5a, 5a which extend upward and front-back directions in the middle of the top plate 15. The opposite surfaces 5a,5a of the flat plate of the coil unit securing member 5 are planes vertical to the plane of the top surface of the top plate 15. The coil unit securing member 5 has a coil-unit-holding through hole 5b penetrating the opposite surfaces 5a,5a thereof and a shaft relief portion 5c formed by removing an arc shape from the top edge thereof. The coil unit 6 is fixed to the inner wall of the coil-unit-holding through hole 5b by a fixing means such as an adhesive.

The rotary shaft support 3 is formed separately from the side rest 16. The rotary shaft support 3 is, for example, formed of a plate-like wall structure and is fixed to the top face of the side rest 16 by a fixing means such as an adhesive. The rotary shaft support 3 is provided, in the upper side surface thereof, with a bearing 21 to rotatably support an end portion 41 of the rotary shaft 4. The bearing 21 is formed as a bearing member fitted in a hole made in the upper side surface of the rotary shaft support 3 or as a bearing hole formed in the upper side surface of the rotary shaft support 3.

The rotary shaft 4 has end portions 41,41, a yoke member positioning portion 42, a magnet corresponding portion 43 and a shaft reinforcement portion 44. The end portions 41,41 of the rotary shaft 4 are rotatably supported by the bearings 21,21 in the respective rotary shaft supports 3,3. As shown in FIG. 11, the rotary shaft 4 is provided with the shaft reinforcement portion 44 in the middle thereof and the yoke member positioning portion 42 and the magnet corresponding portion 43 between the shaft reinforcement portion 44 and the end portion 41. While the shaft reinforcement portion 44, the magnet corresponding portion 43, and the end portion 41 are formed with circular cross sections, the yoke member positioning portion 42 is formed with a polygonal cross section. The yoke member positioning portion 42 is, for example, formed with a regular hexagonal cross section. The arrangement of these portions may be such that the shaft reinforcement portion 44 and the left and right magnet corresponding portions 43,43 adjoin each other, the magnet corresponding portion 43 and the yoke member positioning portion 42 adjoin each other, and the yoke member positioning portion 42 and the end portion 41 adjoin each other.

The end portion 41 of the rotary shaft 4 is formed such that the diameter of the circular cross section thereof is smaller than the diameter of the inscribed circle of the regular hexagonal cross section of the yoke member positioning portion 42. The magnet corresponding portion 43 is formed such that the diameter of the circular cross section thereof is larger than the diameter of the circumscribed circle of the regular hexagonal cross section of the yoke member positioning portion 42. The shaft reinforcement portion 44 is formed such that the diameter of the circular cross section thereof is larger than the diameter of the magnet corresponding portion 43.

The rotator 7 is formed of a yoke member 71 and a magnet 72. In other words, the rotator 7 is constructed of a yoke member 71 and a magnet 72, which serves as a fan-shaped eccentric weight.

The yoke member 71 has a fan-shaped yoke face plate 73, a positioning hole 74, and magnet positioning plates 75,75, 76. The yoke face plate 73 has a fan section 73a and a pivot section 73b of the fan. The fan shape of the yoke face plate 73 is formed such that the angle between the two radial edges of the fan is 120 degrees, for instance. The positioning hole 74, which is formed in the pivot section 73b of the fan of the yoke face plate 73, is formed into a regular hexagonal hole corresponding to the regular hexagonal sectional shape of the yoke member positioning portion 42 of the rotary shaft 4. The magnet positioning plates 75,75 are disposed along the two radial side edges of the yoke face plate 73. The magnet positioning plate 76 is disposed along the arc edge of the yoke face plate 73. The magnet positioning plates 75,75,76 are disposed in such a manner as to project in one vertical direction from one of the faces of the yoke face plate 73.

The yoke member 71 is formed of a soft magnetic material such as iron, nickel, permalloy, sendust alloy, or some amorphous metal.

The magnet 72 is formed of fan-shaped magnets which are obtained by dividing a circular plate of a predetermined thickness having a circular hole in the center thereof into fan-shaped parts with the center thereof as the pivot. The pivot of the fan-shaped magnet 72 has a curved notch portion 80 corresponding to the peripheral surface of the rotary shaft 4. For example, the fan-shaped magnet 72 to be used may be a combination of two unit fan-shaped magnets 77, each having an angle of 60 degrees between the radial edges, which is formed into a fan shape having a combined angle of 120 degrees between the radial edges thereof. Use of these unit fan-shaped magnets 77, each having an angle of 60 degrees between the radial edges, is considered preferable because they provide stable magnetic force and the rate of changes in the direction of magnetic flux φ passing through the space 60 (see FIG. 14) of the tube of each coil winding 61 can be quickened.

Figure 14:
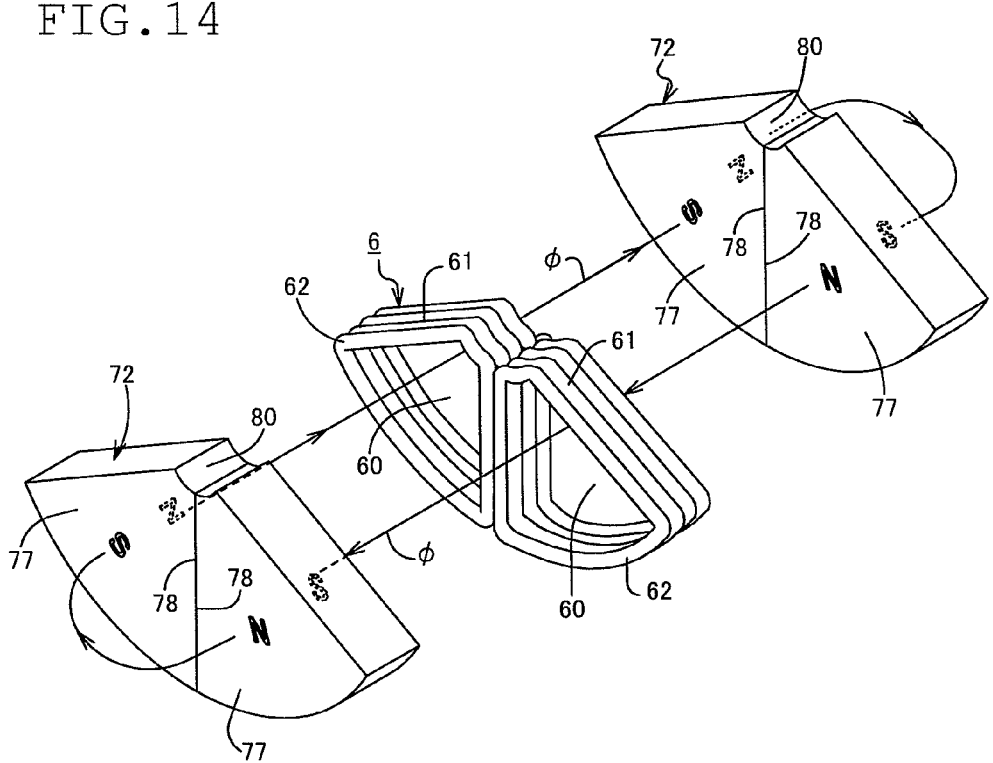
FIG. 14 is a perspective view showing a relationship between a coil unit and magnets (second embodiment).

As shown in FIG. 14, the unit fan-shaped magnet 77 is a magnet so formed that one of its fan face sides is polarized as north pole and the other thereof as south pole. The fan-shaped magnet 72 is formed by having the edge faces 78,78 of two unit fan-shaped magnets 77,77 bonded together in such a manner that different poles adjoin each other.

That is, there is an increase in pole changing points with the rotator 7 which has the unit fan-shaped magnets 77,77, having a plurality of alternately different magnetic poles, arranged along the rotational direction thereof. And, as the rotator 7 rotates, the rate of changes in the direction of magnetic flux φ passing through the space 60 of the tube of each coil winding 61 can be made quicker, so that high power can be produced.

The magnet 72 is formed in a size that allows its placement in a magnet setting area 79 enclosed by the magnet positioning plates 75,75,76.

For example, a fan-shaped magnet 72 is so formed as to have a fan face of an equal area to that of one fan face 73u of the fan section 73a enclosed by the magnet positioning plates 75, 75, 76, and a rotator 7 is constructed with the one fan face 73u of the fan section 73a and the fan face of the magnet 72 fixed to each other by a fixing means such as magnetism or an adhesive.

That is, the magnet 72 of the rotator 7 is so configured as to have a yoke face plate 73 on the side opposite to the face thereof facing the coil unit 6 and also the magnet positioning plates 75,75,76 functioning as the yoke on the periphery of the fan thereof. Therefore, generation of self-contained magnetic field within the magnet 72 can be controlled, and the magnetic flux density of magnetic flux φ passing through the space 60 of the tube of each coil winding 61 can be raised, so that high power can be produced.

Also, the yoke member 71 is provided with the magnet setting area 79 such that the magnet 72 can be easily placed in the magnet setting area 79 which is in a fixed position of the yoke member 71. Therefore, it is easier to fabricate the rotator. Also, any positional shift of the magnet 71 can be prevented, thus making it possible to supply stable magnetic field to the coil unit 6.

Also, the rotator 7 has a positioning hole 74, as amounting hole for the rotary shaft 4, in the pivot section 73b of the fan section thereof. And the magnet 72 is formed in a fan shape corresponding to the fan-shaped magnet setting area 79 enclosed by the yoke face plate 73 and the magnet positioning plates 75,75,76. It has a curved notch portion 80 corresponding to the peripheral surface of the rotary shaft 4 at the pivot of the fan and is placed in the magnet setting area 79.

That is, the arrangement is such that the magnet 72 does not have any part for mounting onto the rotary shaft 4. This makes it easier for the rotator 7 to rotate, and the rate of changes in the direction of magnetic flux φ passing through the space 60 of the tube of each coil winding 61 is made quicker, so that high power can be produced. Moreover, it becomes possible to perform continuous power generation efficiently and increase the output of electricity.

Also, the use of the magnet 72 as an eccentric weight can reduce the number of component parts required and makes the rotation of the magnet 72 easier. As a result, high power can be produced, and also the output of electricity can be increased.

Figure 12:
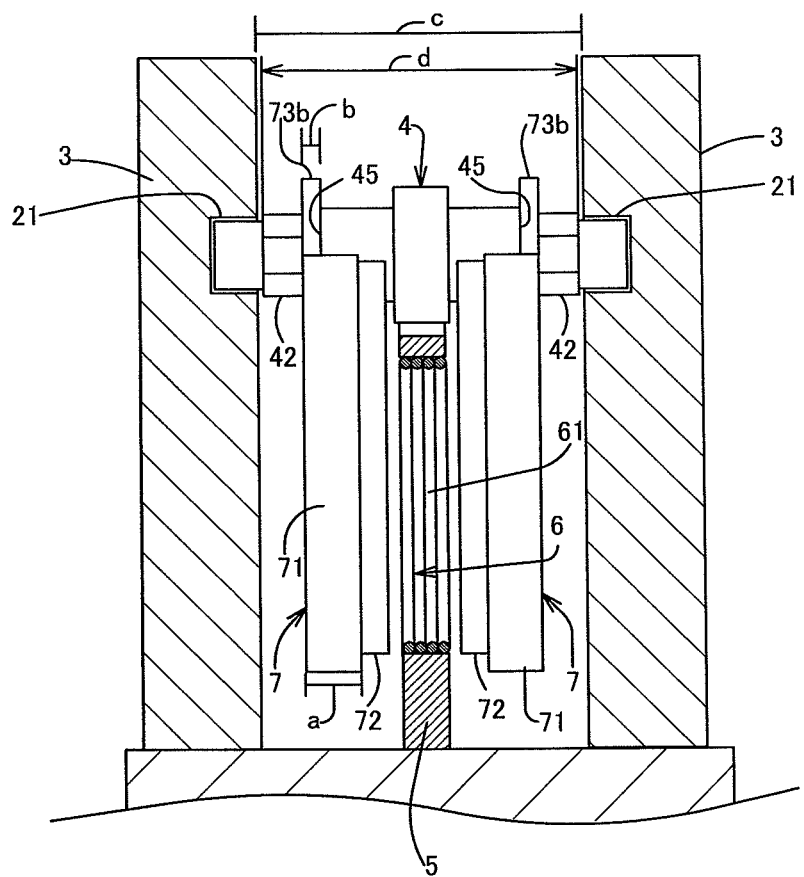
FIG. 12 is a cross-sectional view showing an intra-tire power generating apparatus (second embodiment).
Figure 13:
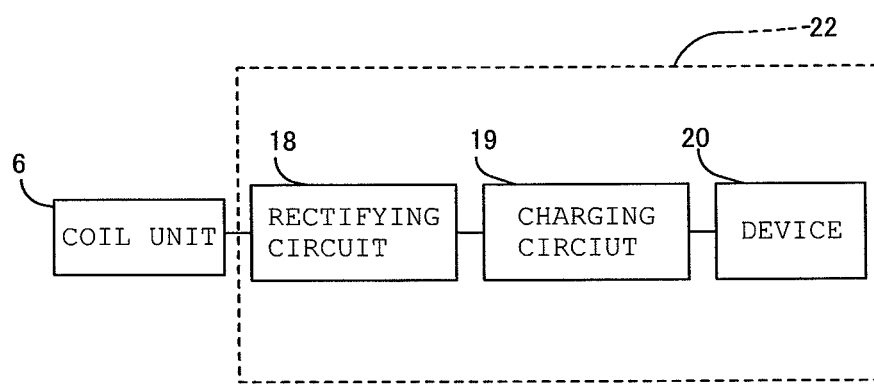
FIG. 13 is a block diagram showing a pack of electric components connected to a coil unit (second embodiment).

The yoke member positioning portion 42 having a hexagonal cross section of the rotary shaft 4 is inserted into the positioning hole 74 of the yoke member 71 from the side of the end portion 41 thereof, thereby positioning the magnet 72 of the rotator 7 on the side of the shaft reinforcement portion 44 of the rotary shaft 4, and, as shown in FIG. 12, the hole edge face 46 of the positioning hole 74 in the pivot section 73b of the fan of the yoke face plate 73 is brought into contact with the edge face 45 of the magnet corresponding portion 43 of the rotary shaft 4. In so doing, if the yoke member 71 and the rotary shaft 4 are fixed to each other by a fixing means such as an adhesive, the integration of the yoke member 71 and the rotary shaft 4 can be realized more reliably.

And, with the end portions 41,41 of the rotary shaft 4 inserted rotatably in the bearings 21 in the rotary shaft supports 3, the rotary shaft supports 3 are fixed to the top surface of the top plate 16 by a fixing means such as an adhesive.

The rotators 7,7 are fitted onto the respective yoke member positioning portions 42,42 of the rotary shaft 4 in such a manner that the fan faces of the magnets 72,72 thereof face each other.

According to the second embodiment, the sectional shape of the yoke member positioning portion 42 and the hole shape of the positioning hole 74 are both a regular hexagon. This makes it easy to perform the work of fitting the rotators 7,7 on the respective yoke member positioning portions 42,42 of the rotary shaft 4 by positioning the magnets 72, 72 such that the center lines of the fan faces of the magnets 72,72 are aligned with each other and the fan faces of the magnets 72,72 face each other. It should be noted that this fitting work can be made easy provided that a polygonal shape having three or more angles is chosen for the positional hole 74 and a polygonal shape corresponding to the polygonal hole is chosen for the sectional shape of the yoke member positioning portion 42.

A rotary component set 25 is constituted by the rotary shaft 4 rotatably supported by the bearings 21 and the rotators 7 which are configured to rotate together with the rotary shaft 4 around the center line thereof as the center of rotation. The rotator 7 may be usable if it has its center of rotation (pivot 73*x* of the fan of the yoke face plate) dislocated from its center of gravity and its fan shape is formed such that the angle between the two radial edges of the fan is 180 degrees or less.

As shown in FIG. 14, the coil unit 6 is constituted of two coil windings 61,61, which have each a coil 62 wound around in a tubular shape surrounding a space 60, where magnetic flux ϕ generated between the mutually opposite magnetic poles of the magnets 72,72 of the rotators 7,7, which face each other as they rotate together with the rotary shaft 4, passes. For example, a coil winding 61 provides a structure of a coil 62 wound around to form a fan-sectioned tube shape through which magnetic flux ϕ generated between the magnets 72,72 of the two rotating rotators 7,7 passes. Preferably, a rectangular wire having a rectangular cross section should be used for the coil 62. This will bring about an enhanced power generation efficiency because the winding resistance can be reduced, the coil turns increased, and the winding density raised.

For example, as shown in FIG. 10 and FIG. 14, the coil windings 61 are located in a projected area of the rotation locus of the magnets 72 of the rotators 7. Therefore, the magnetic flux density of magnetic flux ϕ passing through the space 60 of the tube of each coil winding 61 can be raised, so that high power can be produced.

It is to be noted that if the outer periphery of the coil unit 6 is larger than that of the magnet 72, power generation efficiency will be lowered because of the longer winding length of each coil winding 61 and the consequently greater resistance thereof. Yet, according to the second embodiment, the arrangement is such that the peripheral shape of the cross section of the tube of the coil winding 61 is the same as the peripheral shape of the cross section of the magnet 72, and the peripheral length of the cross section of the coil winding 61 is smaller than the peripheral length of the cross section of the magnet 72 when the center line of the cross section of the magnet 72 coincides with the center line of the cross section of the coil winding 61 with the rotation of the rotator 7. As a result, the resistance of the coil winding 61 will be small, and the power generation efficiency high.

Also, the arrangement is such that when the rotator 7 rotates, the fan face of the unit fan-shaped magnet 77 and the end of the fan-sectioned tube of the coil winding 61 face each other in the direction along the rotary shaft 4, and the magnets 72,72 of the rotators 7,7 are disposed symmetrically with respect to the coil unit 6 in the middle. Therefore, stable magnetic field can be supplied to the coil unit 6, thus raising the power generation efficiency.

As shown in FIG. 12, the distance c between the rotary shaft supports 3,3 is configured to be shorter than the total length of the rotary shaft 4 and longer than the length d which is the length of the rotary shaft 4 minus the end portions 41,41. This can help reduce contact interference between the rotary shaft support 3 and the yoke member positioning portion 42. Accordingly, the rotation of the rotary shaft 4 can be made smoother, and the magnet 72 can rotate more easily. Thus, it will be possible not only to produce high power, but also to increase the output of electricity. Moreover, it will be possible to prevent the rotary shaft 4 from coming off the bearings 21.

Further, the yoke member positioning portion 42 is fitted into the positioning hole 74 in the pivot section 73*b* of the fan of the yoke face plate 73 in such a manner that the hole edge face 46 of the positioning hole 74 is in contact with the edge face 45 of the magnet corresponding portion 43 of the rotary shaft 4. Hence, the distance between the magnet 72 of the rotator 7 and the coil unit 6 can be maintained nearly constant, which allows efficient and stable production of voltages.

An intra-tire power generating apparatus 1 implementing a structure as described above is secured with the underside 11*a* of the base 2 fixed to a position which is equivalent to the back side of the tread surface, for instance, in the tire air chamber. Now, as the vehicle travels, the rotators 7,7 rotate, and the two magnets 72,72 facing each other also rotate, in response to variations in centrifugal force which has the highest energy among all the vibrations within the tire. Along with the rotation of these two magnets 72,72, there occur changes in the direction of magnetic flux ϕ passing through the space 60 of the tube of each coil winding 61, which in turn generate voltages in the coils 62. These voltages are charged to the charging circuit 19 via the rectifying circuit 18 and then supplied to the device 20.

A pair of a rectifying circuit 18 and a charging circuit 19 may be provided for the whole of the coil unit 6, but, more preferably, a pair of a rectifying circuit 18 and a charging circuit 19 may be provided for each of the coil windings 61 of the coil unit 6, so that the amount of charge can be increased.

It is to be noted that the vibration resulting from the rotation of a tire is caused by changes in yaw due to the bending of the belts in the tire. This tire vibration appears in particular at the moment of the tire engaging a road surface and the moment of the tire disengaging it. The closer the point is to the center of the tire from the belts, the greater this vibration will be. Thus, if the base 2 is fixed to the back side of the tread surface and the rotary shaft 4 rotatably supporting the rotator 7 is located in a position further away from the back side of the tread surface toward the center of the tire, then a large energy can be given to the rotator 7, with large acceleration working thereon. Accordingly, the rotary shaft 4 is positioned such that the distance thereof from the back side of the tread surface toward the center of the tire is 10 mm or more and 40 mm or less.

Thus, the arrangement is such that the coil unit 6 is fixed to the coil unit securing member 5 which is fixed to the inner surface of a tire via the base 2. Therefore, the position of the coil unit 6 relative to the two rotators 7,7 rotating while facing each other can be maintained with precision, so that disturbance in the magnetic flux ϕ can be prevented and the power generation efficiency raised.

Also, the rotary shaft 4 is disposed on the back side of the tread surface in such a manner as to extend in the tire axial direction. As a result, the rotator 7 can rotate more easily in response to variations in centrifugal force and circumferential acceleration working on the tire of a traveling vehicle, so that high power can be produced and the output of electricity can be increased.

With the intra-tire power generating apparatus according to the second embodiment, the eccentric weight of the rotator 7 is constructed of a magnet 71. This can make the apparatus smaller and lighter because the number of component parts can be reduced in comparison with the arrangement of having the rotator 7 and the magnet 72 separately. Also, this arrangement allows the rotator 7 to rotate with greater ease, so that high power can be produced and the output of electricity can be increased.

Example of Second Embodiment

The tire size used was 225/55R17.

An intra-tire power generating apparatus 1 was installed within a tire air chamber by joining the underside 11a of the base 2 to an axially middle portion on the back side of the tread surface with an adhesive. It was installed in such a way that the rotary shaft 4 extended in the tire axial direction. The distance from the back side of the tread surface to the rotary shaft 4 was 20 mm.

The rotary shaft 4 used was of the following dimensions: The total length was 22.5 mm. The length of the shaft reinforcement portion 44 was 3 mm, the length of the magnet corresponding portion 43 was 4 mm, the length of the yoke member positioning portion 42 was 3.25 mm, and the length of the end portion 41 was 2.5 mm. The diameter of the shaft reinforcement portion 44 was 3.5 mm, the diameter of the magnet corresponding portion 43 was 2.5 mm, the maximum diameter of the yoke member positioning portion 42 was 2.5 mm, and the diameter of the end portion 41 was 2 mm.

The yoke member 71 used was of the following dimensions: The inner dimension of the fan, which is the distance from the pivot 73x of the fan of the yoke face plate 73 (rotation center of the rotator 7) to the inner face 76a of the magnet positioning plate 76 disposed along the arc edge of the yoke face plate 73, was 9 mm, and the outer dimension of the fan, which is the distance from the pivot 73x of the fan of the yoke face plate 73 to the outer face 76b of the magnet positioning plate 76 disposed along the arc edge of the yoke face plate 73, was 9.5 mm. And the angle between the inner face 75a and the inner face 75a of the two magnet positioning plates 75,75 disposed along the two radial edges of the yoke face plate 73 was 120 degrees. Also, as shown in FIG. 12, the width a of the magnet positioning plates 75,75,76 was 3 mm, and the width b of the yoke face plate 73 was 1 mm.

The unit fan-shaped magnet 77 used was a neodymium magnet, of which the inner diameter of the arc of the pivot of the fan was 4 mm, the outer diameter of the fan was 18 mm, the thickness was 4 mm, and the weight was 2.35 grams.

The coil winding 61 used was of the following dimensions: The inner diameter of the arc of the pivot of the fan was 5 mm, and the outer diameter of the fan was 18 mm. The total length of the tube was 2 mm. The coil wire diameter was 0.08 mm. The number of turns was 500 turns.

The value of Imax/Itotal to be explained in the second embodiment was 0.97.

The total weight of the intra-tire power generating apparatus 1 including the pack of electric circuits 22 was 13 grams.

The vehicle was operated from the stored voltage of 0 V until it stabilizes at a certain voltage level at each of the speeds of 30 km/h to 80 km/h in 10 km/h increments.

The output of electricity ($W=V^2/R$) was calculated from the stabilized voltage and the load ($R=300\Omega$) of the device.

Figure 15:
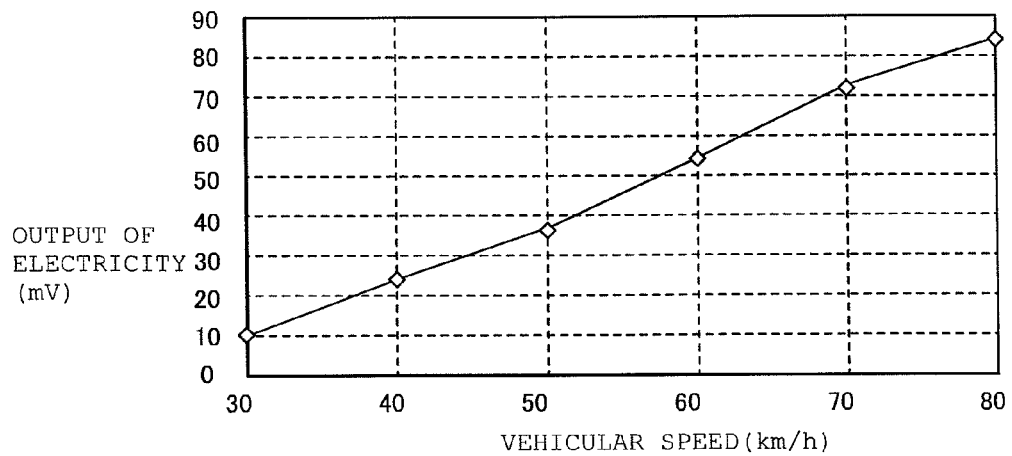
FIG. 15 is a diagram showing the results of output of electricity by an example (second embodiment).

The relationship between the vehicle speed and the output of electricity obtained in this example is shown in FIG. 15.

Figure 16:
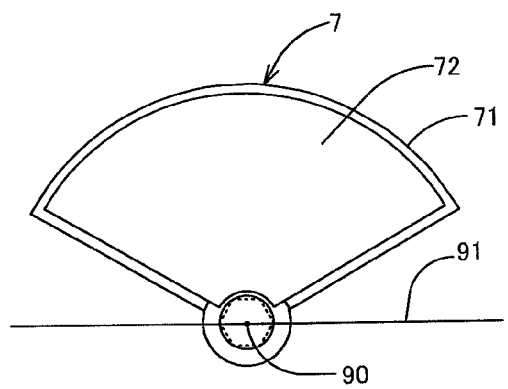
FIG. 16 is a diagram for explaining the ratio of the moments of inertia of the rotator (second embodiment).

According to the second embodiment, as shown in FIG. 16, the moment of inertia (Imax), when the rotator 7 is divided into two parts by a plane 91 passing the rotation center 90 thereof in such a manner as to maximize the moment of inertia thereof, is chosen to be 80 percent or more of the total moment of inertia (Itotal) thereof. That is, the ratio of the moments of inertia employed is: Ix=Imax/Itotal=0.8 or above.

Figure 17:
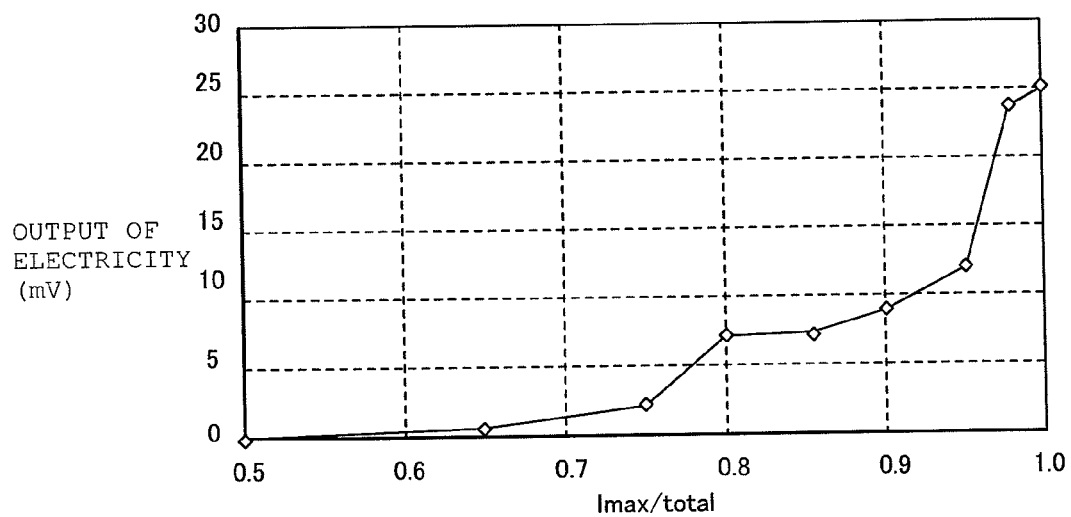
FIG. 17 is a diagram showing a relationship between the output of electricity and the ratio of the moments of inertia of the rotator (second embodiment).

Shown in FIG. 17 are the experimental results of the output of electricity in relation to the ratio of the moments of inertia 1x, which were obtained by preparing a plurality of rotators 7 having different values of Imax/Itotal, namely, 0.5, 0.65, 0.75, 0.8, 0.85, 0.9, 0.95, 0.98, and 1.0. Note that the value of Imax/Itotal being 1.0 is equal to a state in which the rotator 7 is not divided into two parts by the plane 91 passing the rotation center 90 thereof, but the whole of the rotator 7 is on one side of the division by the plane 91. From FIG. 17, it is found that the use of the rotator 7 whose ratio of the moments of inertia 1x is 0.8 or above allows the rotator 7 to have a larger degree of eccentricity, thus taking in large circumferential acceleration at the time of a tire engaging a road surface. Accordingly, the rotator can rotate with greater ease, so that high power can be produced and the output of electricity increased.

Figure 18:
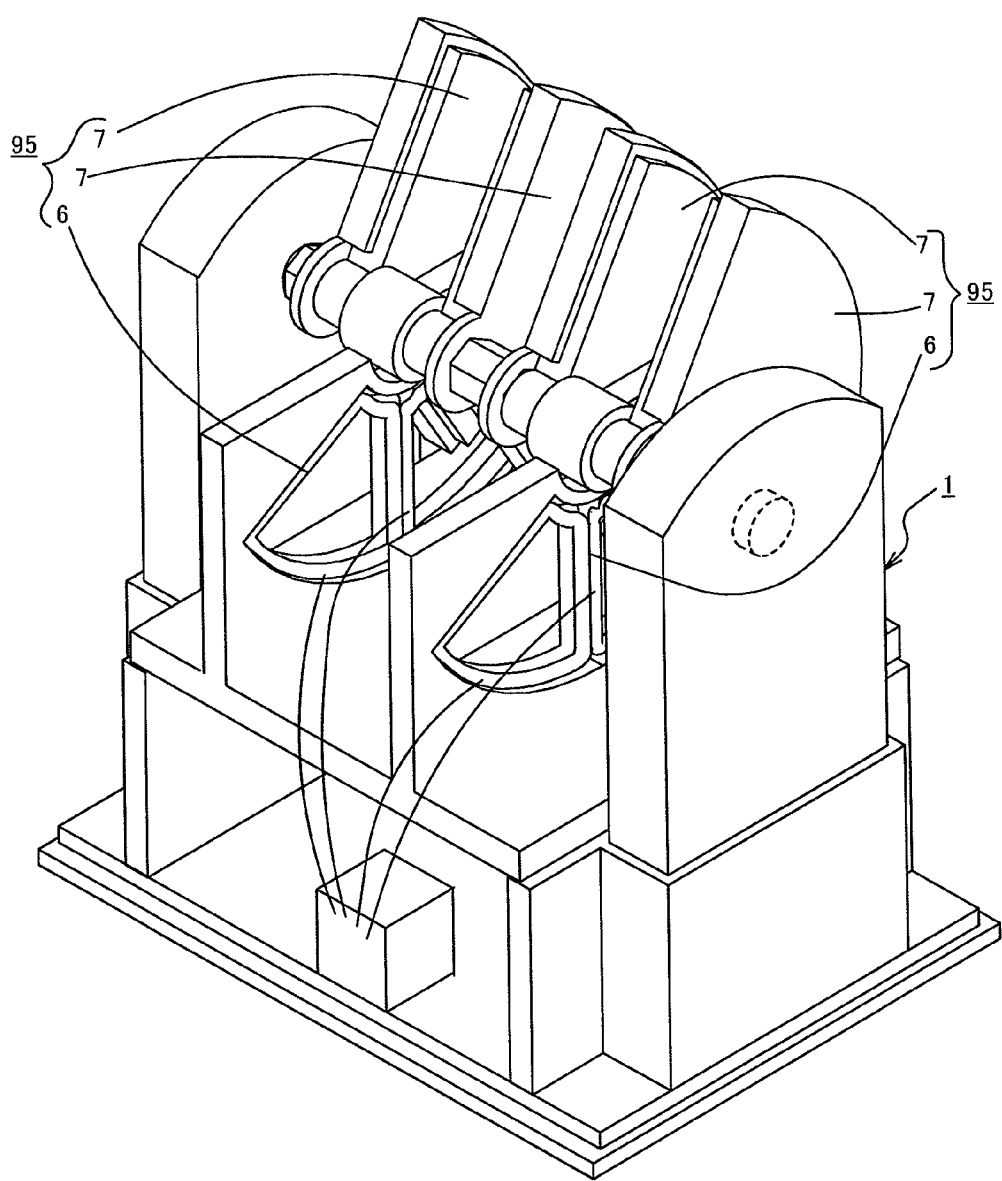
FIG. 18 is a perspective view showing an intra-tire power generating apparatus (second embodiment).

According to the second embodiment, as shown in FIG. 18, the intra-tire power generating apparatus 1 may be of a structure provided with two of more of a power generating section 95 which consists of rotators 7,7 and a coil unit 6.

Figure 19:
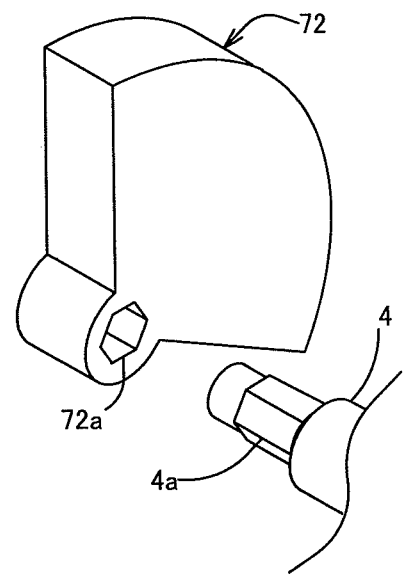
FIG. 19 is an illustration showing a magnet (second embodiment).
Figure 20:
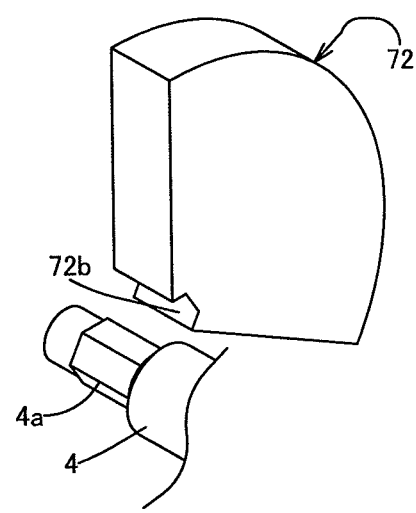
FIG. 20 is an illustration showing a magnet (second embodiment).

According to the second embodiment, the arrangement may be such that the magnet 72 is attached directly to the rotary shaft 4. For example, as shown in FIG. 19, a magnet 72 provided with a mounting hole 72a by which it is fitted on a hexagonally sectioned shaft portion 4a of the rotary shaft 4 may be used. Or, as shown in FIG. 20, a magnet 72 provided with a mounting recess 72b by which it is fitted on a hexagonally sectioned shaft portion 4a of the rotary shaft 4 may be used.

According to the second embodiment, the coil unit 6 may be formed of a plurality of coil windings 61 so arranged as to completely surround the rotary shaft 4.

In the foregoing description, the rotator 7 is constructed of a yoke member 71 and a magnet 72 which serves as an eccentric weight. According to the second embodiment, however, it is considered satisfactory provided at least the center of gravity portion of the eccentric weight is made of a magnet.

Figure 21A:
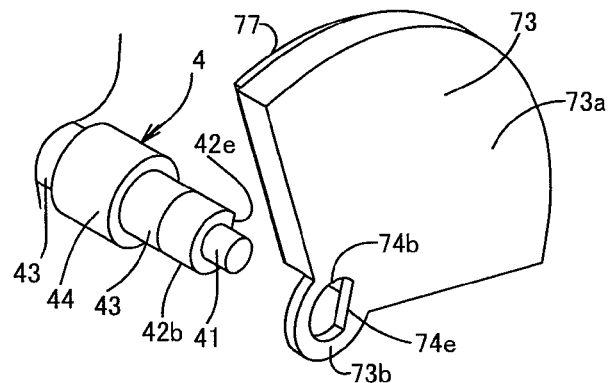
FIG. 21 is perspective views showing amounting hole and a portion of the rotary shaft to be fitted in the mounting hole (second embodiment).
Figure 21B:
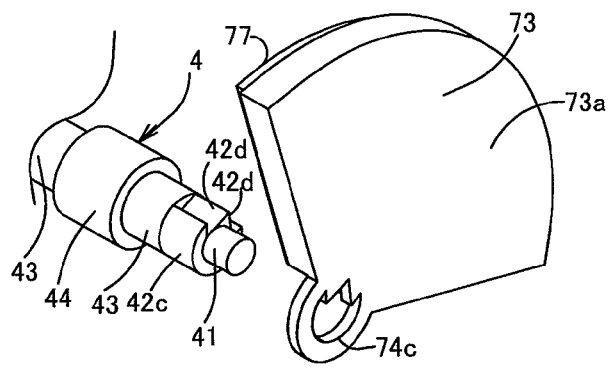
Figure 21C:
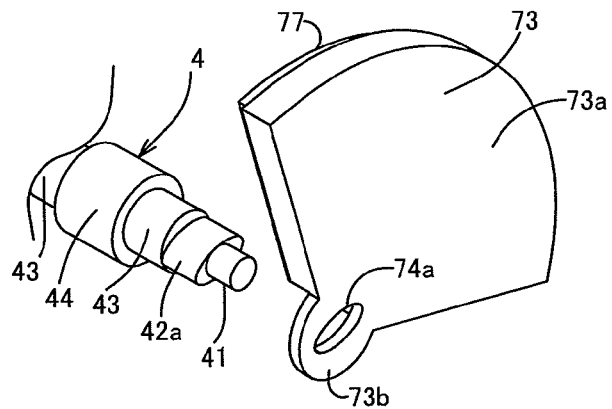

In the foregoing description, the yoke member positioning portion 42 has a regular hexagonal cross section, and the positioning hole 74 is a regular hexagonal hole corresponding to the regular hexagonal cross section of the yoke member positioning portion 42. According to the second embodiment, however, the positioning hole 74 may be formed in a hole which has at least one straight side 74e and the portion of the rotary shaft to be fitted in the positioning hole 74 is formed in a sectional shape corresponding to the positioning hole. That is, as shown in FIG. 21A, the yoke member positioning portion 42b may have a segmental (bow-shaped) cross section, and the positioning hole 74b may be a segmental hole corresponding to the segmental cross section of the yoke member positioning portion 42b. The yoke member positioning portion 42b has a straight side 42e (chord) connecting a point of the arc with a point of the arc. The positioning hole 74b has a straight side 74e (chord) corresponding to the straight side 42e. Also, as shown in FIG. 21B, the yoke member positioning portion 42c may have a deformed circular cross section which has a V-shaped notch groove 42c formed in two positions inward from the outer periphery of the precise circle cross section, and the positioning hole 74c may be a deformed circular hole corresponding to the deformed circular cross section of the yoke member positioning portion 42c. Also, as shown in FIG. 21C, the yoke member positioning portion 42a may have an elliptical cross section, and the positioning hole 74a may be an elliptical hole corresponding to the elliptical cross section of the yoke member positioning portion 42a.

Figure 22A:
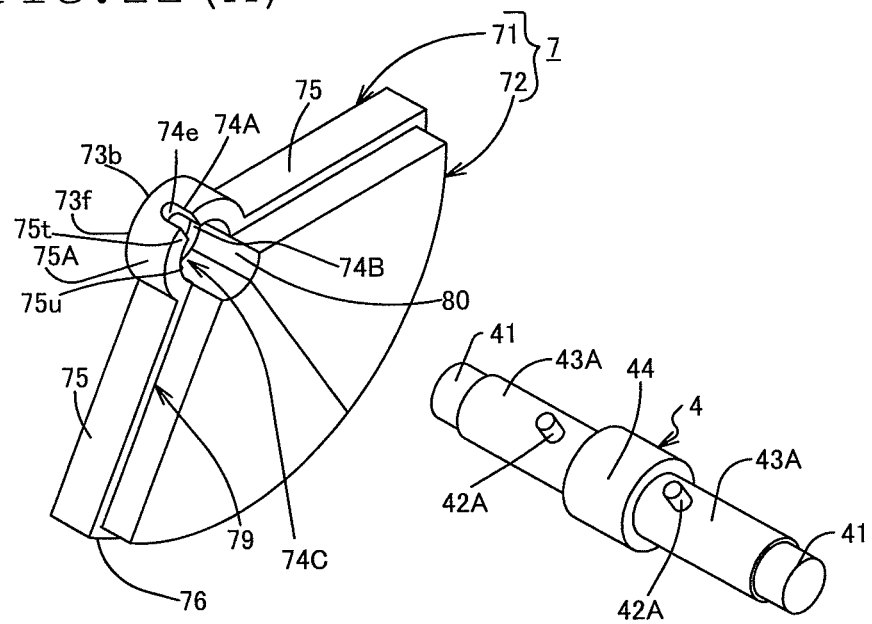
FIG. 22 is perspective views showing a rotary shaft and a rotor (second embodiment).
Figure 22B:
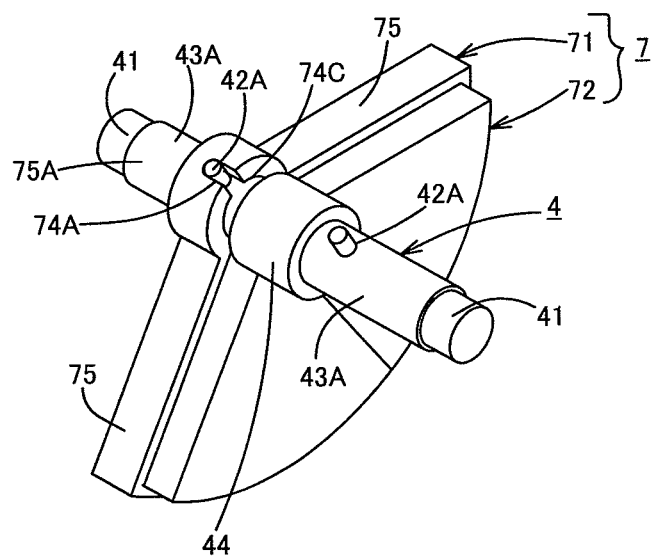

Also, according to the second embodiment, the rotary shaft 4 and the yoke member 71 may be of structures as shown in FIG. 22.

The rotary shaft 4 is formed of a circular-sectioned shaft having end portions 41,41, yoke member positioning portions, and a shaft reinforcement portion 44. The yoke member positioning portions of the rotary shaft 4 are each formed of a projection 42A projecting from the periphery of a shaft portion 43A located between the end portion 41 and the shaft reinforcement portion 44. The projection 42A is formed, for instance, of a pin projecting from a position corresponding to the end face 45 of the above-described magnet corresponding portion 43 on the periphery of the shaft portion 43A in the direction orthogonal to the center line of rotation of the shaft portion 43A. The shaft diameter of the shaft portion 43A is larger than that of the end portion 41 and smaller than that of the shaft reinforcement portion 44.

The yoke member 71 has an engagement groove 74A into which the projection 42A is fitted. The yoke member 71 has a curved plate 75A that rises from the outer peripheral edge 73f of the pivot section 73b of the fan in the same direction as the magnet positioning plates 75,75,76 and connects with the magnet positioning plates 75,75. And the engagement groove 74A is formed of a groove that extends from the rise end 74t of the curved plate 75A toward the outer peripheral edge 73f of the pivot section 73b of the fan and is dead-ended nearer to the outer peripheral edge 73f of the pivot section 73b.

Accordingly, when the magnet 72 is placed in the magnet setting area 79 defined by the magnet positioning plates 75, 75, 76, the curved notch portion 80 of the magnet 72 and the inner wall surface 75u of the curved plate 75 together form a tubular hole 74C which supports the shaft portion 43A fitted therein.

The pivot section 73b of the fan of the yoke member 71 has the positioning hole 74B formed in a circular hole which the shaft portion 43A can penetrate in a fitted manner.

The center of the tubular hole 74C and the center of the positioning hole 74B are aligned with each other, and the tubular hole 74C and the positioning hole 74B are formed with the same hole diameter.

In a structure as described above, the rotary shaft 4 is inserted, from the end portion 41 thereof, into the tubular hole 74C and the positioning hole 74B, and the projection 42A is fitted into the engagement groove 74A. With the projection 42A butted against the dead-end wall 74e of the engagement groove 74A, the shaft portion 43A is fitted in and supported by the tubular hole 74C.

In a manner as described above, the rotator 7 is mounted on the rotary shaft 4.

Figure 23:
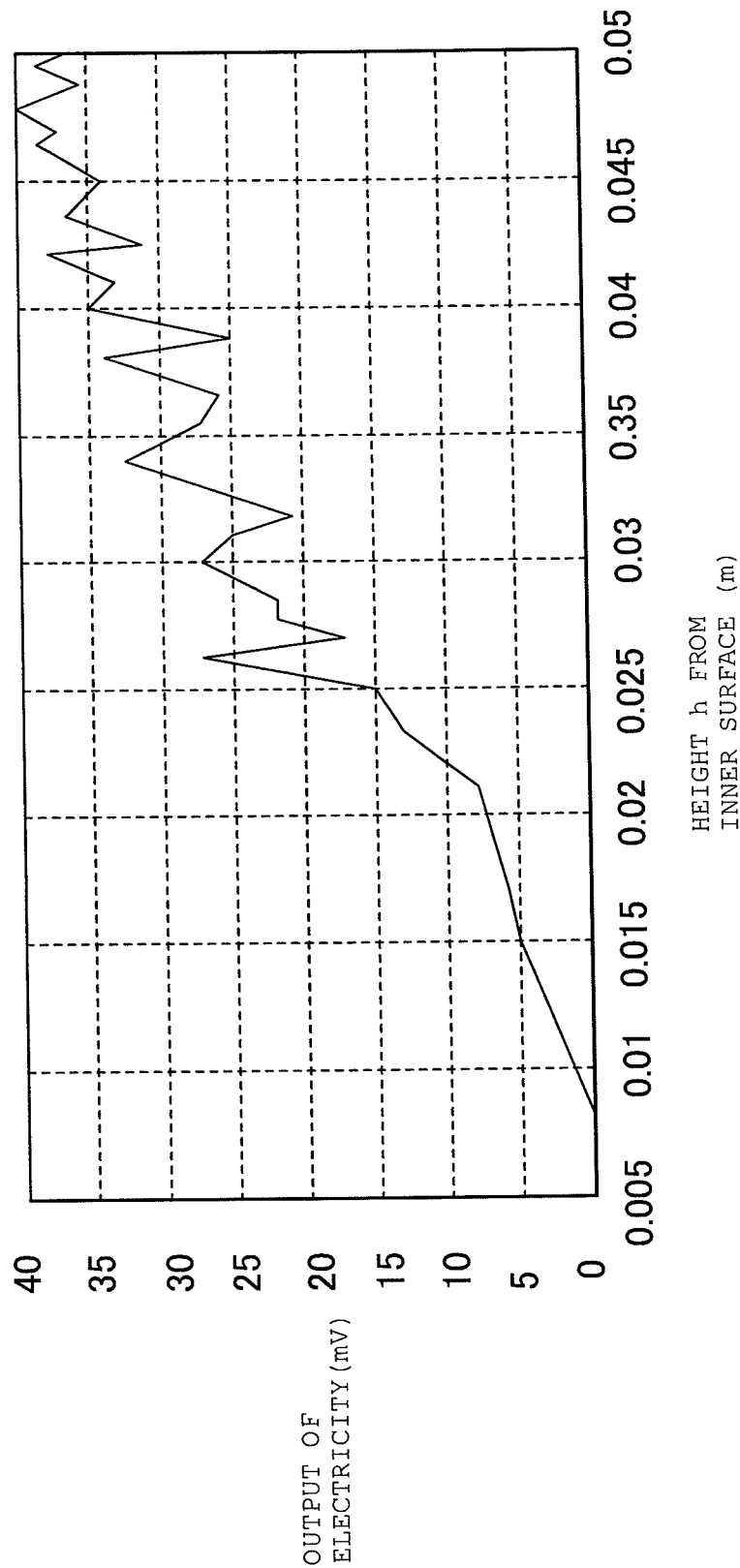
FIG. 23 is a diagram showing a relationship between the height h from an inner surface of the tire to the center line of rotation of the rotary shaft and the output of electricity (second embodiment).

With the intra-tire power generating apparatus according to the present invention, when it is installed on an inner surface of a tire (e.g., backside of the tread surface), the further apart the position of the center line of rotation of the rotary shaft 6 is from the inner surface of the tire (e.g., back side of the tread surface), the greater the output of electricity will be. Shown in FIG. 23 is a relationship between the height h of the center line of rotation of the rotary shaft 4 from an inner surface of the tire and the output of electricity of an intra-tire power generating apparatus 1 which is installed on the inner surface of the tire. As is clear from FIG. 23, little power generation can be expected at the height h of 0.01 m (10 mm) or less, but power generation is promising at the height h of 0.025 m (25 mm) or more. Therefore, to obtain a practically viable output of electricity, the height h is preferably in a range of 0.025 m (25 mm) to 0.030 m (30 mm) in consideration of the relationship between the intra-tire space and the output of electricity.

Figure 24A:
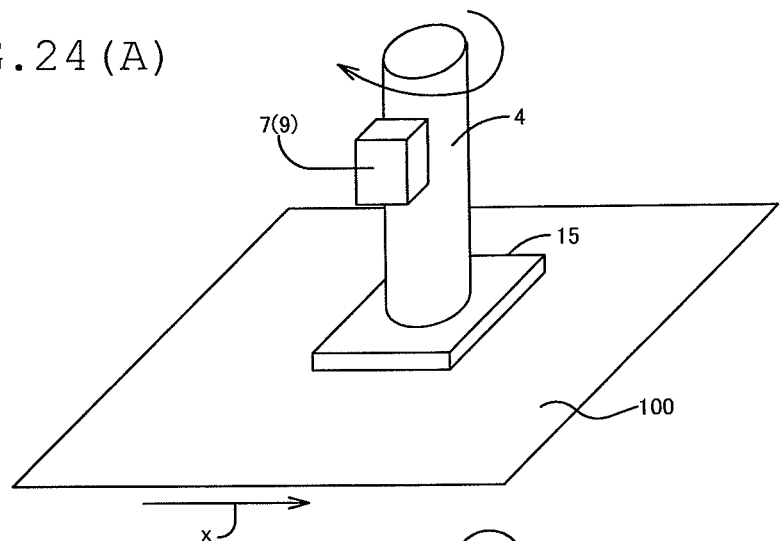
FIG. 24 is perspective views showing the modes of installation on an inner surface of the tire (second embodiment).
Figure 24B:
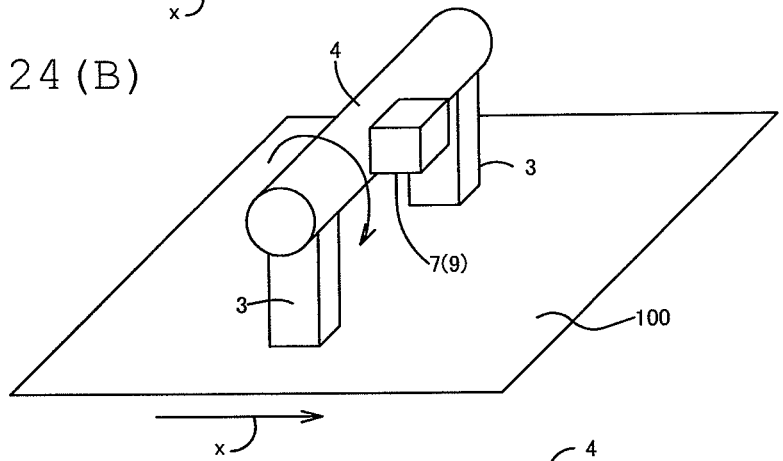
Figure 24C:
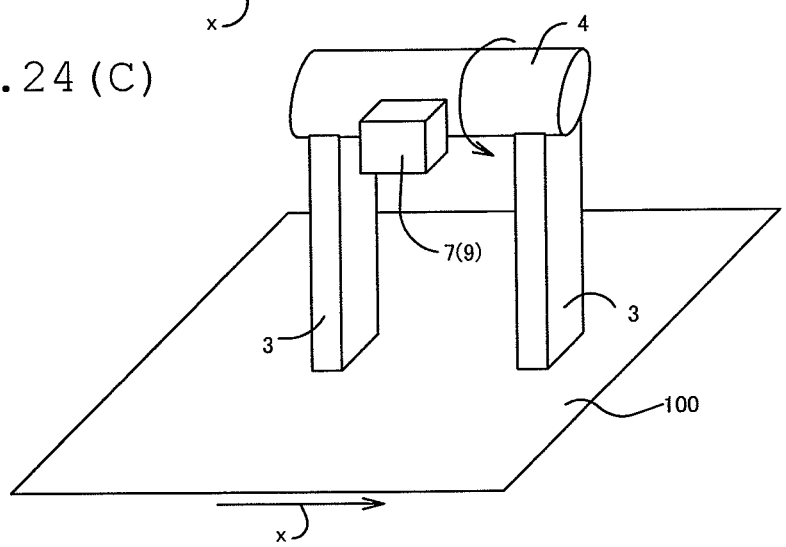

In the present invention, there is no particular limitation on the position of the intra-tire power generating apparatus 1 on an inner surface of a tire. For example, as shown in FIG. 24A, the intra-tire power generating apparatus 1 may be installed on the back side 100 of the tread surface in such a manner that the rotary shaft 4 is orthogonal to the back side 100 of the tread surface (that is, the intra-tire power generating apparatus 1 may be installed on the back side of the tread surface such that the rotary shaft 4 extends in the direction along the diameter of the tire). Or, as shown in FIG. 24B, the intra-tire power generating apparatus 1 may be installed on the back side 100 of the tread surface in such a manner that the rotary shaft 4 extends in the direction along the tire axial direction. Or, as shown in FIG. 24C, the intra-tire power generating apparatus 1 may be installed on the back side 100 of the tread surface in such a manner that the rotary shaft 4 extends in the direction along the rotating direction x of the tire.

The intra-tire power generating apparatus 1 according to the present invention can supply electric power reliably to the devices that require high power in detecting intra-tire temperature and pressure, and other tire information such as pressures working on the tire or slipperiness of the road surface and in continuously transmitting these dynamic data of the tire.

Numeral Reference
1 intra-tire power generating apparatus
2 base
4 rotary shaft
5 coil unit securing member
6 coil unit
7 rotary magnet (first embodiment)
7 rotary magnet (second embodiment)
8 yoke
9 rotary weight
18 rectifying circuit
19 charging circuit
60 space
61 coil winding (second embodiment)
67 coil winding (first embodiment)
71 yoke member
72 region (first embodiment)
72 magnet (second embodiment)
73 yoke face plate
73a fan section
73b pivot section of fan
74 mounting hole
75, 76 magnet positioning plate
79 magnet setting area
80 curved notch portion
X center line of rotation

The invention claimed is:

1. An intra-tire power generating apparatus to be installed in a tire air chamber, the apparatus comprising:
   a plurality of rotary magnets and rotary weights installed with a back side of a tread within the tire air chamber so as to rotate in response to variations in centrifugal force and circumferential acceleration working on a tire of a running vehicle; and
   a coil unit fixed to a back side of a tread within the tire air chamber so as to be located between two of the plurality of rotary magnets facing each other and generating voltages through electromagnetic induction from the rotary magnets,
   wherein the rotary magnets and the rotary weights have an identical center line of rotation, the rotary weights are each so formed as to have the center of gravity thereof dislocated from the center line of rotation thereof, the rotary magnets are each provided, in a plane orthogonal to the center line of rotation, with an even number of regions adjoining each other in the circumferential direction around the center line of rotation, the adjoining regions having different magnetic poles from each other, the two rotary magnets facing each other are so configured as to rotate while maintaining an opposition of the respective regions thereof having mutually opposite magnetic poles, and the coil unit comprises coil windings, each of the coil windings being a coil wound in a tubular shape surrounding a space where magnetic flux generated between the mutually opposite magnetic poles of the two rotating rotary magnets passes; and a rotary shaft of the rotary magnets and the rotary weights is adapted to be disposed on a back side of a tread surface in such a manner as to extend generally parallel to a tire axial direction.

2. The intra-tire power generating apparatus as recited in claim 1, wherein the rotary magnets are provided with a yoke on a surface opposite to a surface thereof facing the coil unit.

3. The intra-tire power generating apparatus as recited in claim 1, wherein the number of the even-numbered regions of the rotary magnets is six.

4. The intra-tire power generating apparatus as recited in claim 1, wherein each of the even-numbered regions of the rotary magnets is a region derived by dividing the rotary magnets into equal parts along the circumferential direction.

5. The intra-tire power generating apparatus as recited in claim 1, wherein the number of the coil windings of a coil unit is the same as the number of the even-numbered regions of the rotary magnets, wherein the coil winding is so formed as to have the same shape in cross section orthogonal to the center line of the tube thereof as the shape of the region, wherein the coil windings are arranged around the center line of rotation, and wherein the center line of the tube of each coil winding is aligned with the center of each of the corresponding regions of the rotary magnets when both ends of the tube of each coil winding face one-on-one the corresponding regions of the two rotary magnets.

6. The intra-tire power generating apparatus as recited in claim 1, wherein the rotary weights are disposed on a side of the respective rotary magnets opposite to the surfaces thereof facing the coil unit and wherein two sets of rotary magnets and rotary weights are disposed symmetrically with respect to the coil unit in the middle.

7. The intra-tire power generating apparatus as recited in claim 1, wherein the rotary weights and rotary magnets are attached to a single rotary shaft and the rotary shaft is supported rotatably at both ends thereof by rotary shaft supports fixed to an inner surface of a tire via a base.

8. An intra-tire power generating apparatus to be installed in a tire air chamber, the apparatus comprising:

a rotator installed with a back side of a tread within the tire air chamber so as to rotate in response to variations in centrifugal force and circumferential acceleration working on a tire of a running vehicle, the rotator being formed of a magnet such that the center of rotation thereof is dislocated from the center of gravity thereof; and a coil unit fixed to a back side of a tread within the tire air chamber so as to be located between the magnets of two rotators facing each other in rotation and generating voltages through electromagnetic induction from the magnets, wherein the coil unit comprises coil windings, each of the coil windings being a coil wound in a tubular shape surrounding a space where magnetic flux generated between mutually opposite magnetic poles of the two rotating rotary magnets passes; and a rotary shaft of the rotator is adapted to be disposed on a back side of a tread surface in such a manner as to extend generally parallel to a tire axial direction.

9. The intra-tire power generating apparatus as recited in claim 8, wherein the moment of inertia (Imax) of the rotator, when the rotator is divided into two parts by a plane passing the center of rotation thereof in such a manner as to maximize the moment of inertia thereof, is 80 percent or more of the total moment of inertia (Itotal) of the rotator.

10. The intra-tire power generating apparatus as recited in claim 8, wherein the rotator has a plurality of magnets having different magnetic poles from each other arranged along the direction of rotation of the rotator.

11. The intra-tire power generating apparatus as recited in claim 8, wherein the magnet of the rotator is provided with a yoke on a surface thereof opposite to a surface thereof facing the coil unit.

12. The intra-tire power generating apparatus as recited in claim 8, wherein the coil windings are located in a projected area of the rotation locus of the magnets of the rotators.

13. The intra-tire power generating apparatus as recited in claim 12, wherein the peripheral shape of the tube of the coil winding in cross section is the same as the peripheral shape of the magnet of the rotator in cross section, and the perimeter of the coil winding in cross section is smaller than the perimeter of the magnet of the rotator in cross section when the center line of the magnet in cross section coincides with the center line of the tube of the coil winding in cross section by the rotation of the rotor.

14. The intra-tire power generating apparatus as recited in claim 8, wherein a plurality of coil windings are provided, and each of the coil windings is provided with a rectifying circuit and a charging circuit.

15. The intra-tire power generating apparatus as recited in claim 8, wherein the magnets of the two rotators are formed in shapes symmetrical to each other with respect to the coil unit in the middle and wherein these two rotators are attached to a single rotary shaft such that the rotators and the rotary shaft are rotatable together while maintaining the opposition of the magnets of the two rotators in shapes symmetrical to each other with respect to the coil unit in the middle.

16. The intra-tire power generating apparatus as recited in claim 8, wherein the whole of the rotator is formed of a magnet.

17. The intra-tire power generating apparatus as recited in claim 8, wherein the rotator is formed of a yoke member and a magnet, wherein the yoke member has a yoke face plate, which consists of a fan section having an angle of 180 degrees or less between the two radial edges of the fan and a pivot section of the fan section, and magnet positioning plates, which are disposed along the outer periphery of the fan section vertically from the face of the fan section, the pivot section of the fan section being provided with a mounting hole for the rotary shaft, and wherein the magnet is formed in a fan shape corresponding to the fan-shaped magnet setting area defined by the yoke face plate and the magnet positioning plates, has a curved notch portion corresponding to the peripheral surface of the rotary shaft at the pivot of the fan, and is placed in the magnet setting area.

18. The intra-tire power generating apparatus as recited in claim 17, wherein the mounting hole is formed in a hole which has at least one straight side and the portion of the rotary shaft to be fitted in the mounting hole is formed in a cross-sectional shape corresponding to the mounting hole.

19. The intra-tire power generating apparatus as recited in claim 1, wherein the coil unit is fixed to a coil unit securing member which is fixed to an inner surface of a tire through a base.

\* \* \* \* \*